(12) United States Patent
Jiang et al.

(10) Patent No.: US 11,523,371 B2
(45) Date of Patent: Dec. 6, 2022

(54) METHOD AND DEVICE IN UE AND BASE STATION FOR WIRELESS COMMUNICATION

(71) Applicants: Qi Jiang, Shanghai (CN); XiaoBo Zhang, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 107 days.

(21) Appl. No.: 16/830,300

(22) Filed: Mar. 26, 2020

(65) Prior Publication Data

US 2020/0229147 A1 Jul. 16, 2020

Related U.S. Application Data

(63) Continuation of application No. PCT/CN2018/122986, filed on Dec. 24, 2018.

(30) Foreign Application Priority Data

Dec. 26, 2017 (CN) .......................... 201711429636.8

(51) Int. Cl.
*H04W 72/02* (2009.01)
*H04L 1/00* (2006.01)
(Continued)

(52) U.S. Cl.
CPC ........... *H04W 72/02* (2013.01); *H04L 1/0003* (2013.01); *H04L 1/1819* (2013.01); *H04W 24/08* (2013.01);
(Continued)

(58) Field of Classification Search
CPC ... H04W 72/02; H04W 24/08; H04W 68/005; H04W 72/0446; H04W 72/0453;
(Continued)

(56) References Cited

U.S. PATENT DOCUMENTS

2017/0127444 A1 5/2017 Goto et al.
2018/0302197 A1* 10/2018 He ...................... H04W 72/046

FOREIGN PATENT DOCUMENTS

CN 101527962 A 9/2009
CN 103891324 A 6/2014
(Continued)

OTHER PUBLICATIONS

CN First Search Report in application No. 201711429636.8 dated Jun. 19, 2020.
(Continued)

*Primary Examiner* — Peter P Chau

(57) ABSTRACT

The present disclosure provides a method and a device in a User Equipment (UE) and a base station for wireless communication. The UE monitors a first-type radio signal in each of a first time-frequency resource pool and a second time-frequency resource pool respectively; the first time-frequency resource pool and the second time-frequency resource pool are located on a first frequency subband and a second frequency subband respectively; the first time-frequency resource pool comprises Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool comprises a corresponding second time-frequency resource subpool. The UE monitors the first-type radio signal on
(Continued)

multiple frequency subbands and determines a monitoring manner depending on whether a resource is occupied.

20 Claims, 16 Drawing Sheets

(51) Int. Cl.
  *H04L 1/18* (2006.01)
  *H04W 24/08* (2009.01)
  *H04W 68/00* (2009.01)
  *H04W 72/04* (2009.01)

(52) U.S. Cl.
  CPC ..... *H04W 68/005* (2013.01); *H04W 72/0446* (2013.01); *H04W 72/0453* (2013.01)

(58) Field of Classification Search
  CPC ... H04W 48/12; H04W 68/02; H04W 72/042; H04L 1/0003; H04L 1/1819; H04L 5/0044; H04L 5/0007; H04L 5/0048; H04L 5/001; H04L 5/0094; H04L 5/0053; H04L 1/0027
  See application file for complete search history.

(56) References Cited

FOREIGN PATENT DOCUMENTS

| CN | 104272841 A | 1/2015 |
|---|---|---|
| CN | 107079275 A | 8/2017 |
| CN | 107113732 A | 8/2017 |
| CN | 2017156973 A | 9/2017 |
| CN | 2017193365 A | 11/2017 |
| WO | 2008154854 A1 | 12/2008 |

OTHER PUBLICATIONS

CN First Office Action in Application No. 201711429636.8 dated Jun. 30, 2020.

«3GPP TSG RAN WG1 Meeting #84bis R1-162323» ZTE Microelectronics,Nubia Consideration of LBT failure in LAA UL HARQ operation.

ISR received in application No. PCT/CN2018/122986 dated Mar. 26, 2019.

* cited by examiner

METHOD AND DEVICE IN UE AND BASE STATION FOR WIRELESS COMMUNICATION

CROSS-REFERENCE TO RELATED APPLICATION

This application is a continuation of International Application No. PCT/CN2018/122986, filed on Dec. 24, 2018, claiming the priority benefit of Chinese Application No. 201711429636.8, filed on Dec. 26, 2017, the full disclosure of which is incorporated herein by reference.

BACKGROUND

Technical Field

The present disclosure relates to transmission methods and devices in wireless communication systems, and in particular to a transmission method and device for radio signals periodically transmitted on unlicensed spectrums.

Related Art

In conventional 3rd Generation Partner Project (3GPP) systems, data transmission can occur on licensed spectrums only. However, with the sharp increase of services, particularly in some urban areas, licensed spectrums probably are difficult to meet the requirements of the services. Communication on unlicensed spectrums is introduced by cellular systems in Release 13 and Release 14 and it is used for transmissions of uplink data and downlink data. To ensure compatibility with access technologies on other unlicensed spectrums, the Listen Before Talk (LBT) technology is adopted by the Licensed Assisted Access (LAA) to avoid interferences caused by multiple transmitters simultaneously occupying one same frequency resource. In the Release 13 and the Release 14, one of the important features of the communication on unlicensed spectrums is that it needs to acquire the assistance of licensed spectrums; and lots of periodically transmitted information, for example, system information, broadcasts and paging information, are all transmitted on licensed spectrums, in order to avoid the problem of failure of transmission due to the uncertainty of the LBT.

At present, technical discussions of the 5G New Radio Access Technology (5G NR) are ongoing. One important feature of the 5G NR is Stand-Alone (SA) unlicensed spectrum services, that is, having no assistance of licensed spectrums. In SA scenarios, the above system information, broadcasts and paging information all need to be transmitted on unlicensed spectrums.

SUMMARY

One simple implementation for the above problem is that the system information, broadcasts and paging information are all transmitted periodically in the condition that the LBT determines corresponding frequency domain resources are not occupied. However, due to the uncertainty of the LBT, the information transmitted in the above periodicity may not be transmitted at multiple time domain positions where the information is preset to be transmitted. As a consequence, huge monitoring complexity would be brought to user equipment, and the system performance would be significantly reduced.

In view of the above problems, the present disclosure provides a solution. Embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a User Equipment (UE) for wireless communication, wherein the method includes:

monitoring a first-type radio signal in each of a first time-frequency resource pool and a second time-frequency resource pool respectively.

Herein, the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; and the Q1 is a positive integer.

In one embodiment, the above method has the following benefits: the first-type radio signal is transmitted on both the first frequency subband and the second frequency subband, and candidate time domain transmitting positions correspond to the Q1 first time-frequency resource subpools and the Q1 second time-frequency resource subpools respectively. Thus, transmission opportunities of the first-type radio signal in time unit are increased. When the transmission on one frequency subband cannot be carried out due to an LBT failure, the UE carries out monitoring on another frequency subband. The transmission opportunities of the first-type radio signal are increased and the transmission delay of the first-type radio signal is reduced.

In one embodiment, the above method has another benefit as follows: whether any one of the first time-frequency resource subpools is occupied is used for determining whether the second time-frequency resource pool includes a corresponding second time-frequency resource subpool, thus the UE can determine whether the first-type radio signal is not detected because the LBT fails or because the base station just does not transmit the first-type radio signal, depending on whether the first time-frequency resource subpool is occupied. Therefore, the UE will not misjudge the situation that the base station just does not transmit the first-type radio signal as the situation that the base station does not transmit the first-type radio signal due to the LBT failure, and avoids blind switch to another frequency subband to search for the first-type radio signal. The above mechanism ensures the stability and robustness of the UE searching for the first-type radio signal on multiple frequency subbands.

According to one aspect of the present disclosure, the above method includes:

monitoring a first-type signaling in each of Q1 first-type time units respectively.

Herein, the monitoring for the first-type signaling is used for determining whether a given first time-frequency resource subpool is occupied, and the given first time-frequency resource subpool is a first time-frequency resource subpool of the Q1 first time-frequency resource subpools which is corresponding to the first-type signaling.

In one embodiment, the above method has the following benefits: through the monitoring of the first-type signaling, the UE determines which of the Q1 first time-frequency resource subpools are occupied. For those given first time-frequency resource subpools which are occupied, but on which the first-type radio signal is not detected, the UE will not subsequently switch to the second time-frequency resource subpools corresponding to the given first time-frequency resource subpools to monitor the first-type radio signal. The above method improves the transmission efficiency of the first-type radio signal and prevents the UE switching back and forth among multiple frequency subbands frequently to receive the first-type radio signal.

According to one aspect of the present disclosure, the above method includes:

monitoring the first-type radio signal in a third time-frequency resource pool.

Herein, the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool includes a corresponding third time-frequency resource subpool.

In one embodiment, the above method has the following benefits: the third frequency subband is added on the basis of the first frequency subband and the second frequency subband, to further reduce the impact caused to the transmission of the first-type radio signal by the LBT.

According to one aspect of the present disclosure, the above method includes:

monitoring a second-type signaling in each of Q1 second-type time units respectively.

Herein, the monitoring for the second-type signaling is used for determining whether a given second time-frequency resource subpool is occupied, and the given second time-frequency resource subpool is a second time-frequency resource subpool of the Q1 second time-frequency resource subpools which is corresponding to the second-type signaling.

In one embodiment, the above method has the following benefits: through the monitoring of the second-type signaling, the UE determines which of the Q1 second time-frequency resource subpools are occupied; for those given second time-frequency resource subpools which are occupied, but on which the first-type radio signal is not detected, the UE will not subsequently switch to the third time-frequency resource subpools corresponding to the given second time-frequency resource subpools to monitor the first-type radio signal. The above method improves the transmission efficiency of the first-type radio signal and prevents the UE switching back and forth among multiple frequency subbands frequently to receive the first-type radio signal.

According to one aspect of the present disclosure, the above method includes:

receiving a second radio signal.

Herein, the first-type radio signal includes first configuration information, the first configuration information is applicable to the second radio signal, and the first configuration information includes at least one among occupied frequency domain resources, a Modulation and Coding Status (MCS), and a Hybrid Automatic Repeat request (HARQ) process number; and the first-type radio signal is a physical layer signaling.

According to one aspect of the present disclosure, the above method includes:

transmitting a third radio signal.

Herein, the first-type radio signal includes second configuration information, the second configuration information is applicable to the third radio signal, and the second configuration information includes at least one among occupied frequency domain resources, an MCS, and a HARQ process number; and the second-type radio signal is a physical layer signaling.

According to one aspect of the present disclosure, the above method is characterized in that: the first-type radio signal includes paging relevant information.

According to one aspect of the present disclosure, the above method includes:

receiving first information.

Herein, the first information is used for determining a first frequency subband set, and the first frequency subband set includes the first frequency subband and the second frequency subband; and the first information is transmitted via an air interface.

In one embodiment, the above method has the following benefits: by configuring the first frequency subband set, the UE monitors the first-type radio signal in the first frequency subband set, to further increase the transmission opportunities of the first-type radio signal.

The present disclosure provides a method in a base station for wireless communication, wherein the method includes:

transmitting a first-type radio signal in one of a first time-frequency resource pool and a second time-frequency resource pool.

Herein, the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; a receiver of the first-type radio signal includes a first terminal; and the Q1 is a positive integer.

According to one aspect of the present disclosure, the above method includes:

transmitting R1 first-type signalings in R1 first-type time units of Q1 first-type time units respectively.

Herein, the R1 first-type time units correspond to R1 first time-frequency resource subpools of the Q1 first time-frequency resource subpools respectively; monitorings for the R1 first-type signalings in the Q1 first-type time units by the first terminal is used by the first terminal to determine whether the Q1 first time-frequency resource subpools are occupied; and the R1 is a positive integer not greater than the Q1.

According to one aspect of the present disclosure, the above method includes:

transmitting the first-type radio signal in a third time-frequency resource pool.

Herein, the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool includes a corresponding third time-frequency resource subpool.

According to one aspect of the present disclosure, the above method includes:

transmitting P1 second-type signalings in P1 second-type time units of Q1 second-type time units respectively.

Herein, the P1 second-type time units correspond to P1 second time-frequency resource subpools of the Q1 second time-frequency resource subpools respectively; monitorings for the P1 second-type signalings in the Q1 second-type time units by the first terminal is used by the first terminal to determine whether the Q1 second time-frequency resource subpools are occupied; and the P1 is a positive integer not greater than the Q1.

According to one aspect of the present disclosure, the above method includes:

transmitting a second radio signal.

Herein, the first-type radio signal includes first configuration information, the first configuration information is applicable to the second radio signal, and the first configuration information includes at least one among occupied frequency domain resources, an MCS, and a HARQ process number; and the first-type radio signal is a physical layer signaling.

According to one aspect of the present disclosure, the above method includes:

receiving a third radio signal.

Herein, the first-type radio signal includes second configuration information, the second configuration information is applicable to the third radio signal, and the second configuration information includes at least one among occupied frequency domain resources, an MCS, and a HARQ process number; and the second-type radio signal is a physical layer signaling.

According to one aspect of the present disclosure, the above method is characterized in that: the first-type radio signal includes paging relevant information.

According to one aspect of the present disclosure, the above method includes:

transmitting first information.

Herein, the first information is used for determining a first frequency subband set, and the first frequency subband set includes the first frequency subband and the second frequency subband; and the first information is transmitted via an air interface.

The present disclosure provides a UE for wireless communication, wherein the UE includes:

a first receiver, to monitor a first-type radio signal in each of a first time-frequency resource pool and a second time-frequency resource pool respectively.

Herein, the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; and the Q1 is a positive integer.

In one embodiment, the above UE for wireless communication is characterized in that: the first receiver further monitors a first-type signaling in each of Q1 first-type time units respectively; the monitoring for the first-type signaling is used for determining whether a given first time-frequency resource subpool is occupied, and the given first time-frequency resource subpool is a first time-frequency resource subpool of the Q1 first time-frequency resource subpools which is corresponding to the first-type signaling.

In one embodiment, the above UE for wireless communication is characterized in that: the first receiver further monitors the first-type radio signal in a third time-frequency resource pool; the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool includes a corresponding third time-frequency resource subpool.

In one embodiment, the above UE for wireless communication is characterized in that: the first receiver further monitors a second-type signaling in each of Q1 second-type time units respectively; the monitoring for the second-type signaling is used for determining whether a given second time-frequency resource subpool is occupied, and the given second time-frequency resource subpool is a second time-frequency resource subpool of the Q1 second time-frequency resource subpools which is corresponding to the second-type signaling.

In one embodiment, the above UE for wireless communication further includes a first transceiver; the first transceiver receives a second radio signal; the first-type radio signal includes first configuration information, the first configuration information is applicable to the second radio signal, and the first configuration information includes at least one among occupied frequency domain resources, an MCS, and a HARQ process number; and the first-type radio signal is a physical layer signaling.

In one embodiment, the above UE for wireless communication further includes a first transceiver; the first transceiver transmits a third radio signal; the first-type radio signal includes second configuration information, the second configuration information is applicable to the third radio signal, and the second configuration information includes at least one among occupied frequency domain resources, an MCS, and a HARQ process number; and the second-type radio signal is a physical layer signaling.

In one embodiment, the above UE for wireless communication is characterized in that: the first-type radio signal includes paging relevant information.

In one embodiment, the above UE for wireless communication is characterized in that: the first receiver further receives first information; the first information is used for determining a first frequency subband set, and the first frequency subband set includes the first frequency subband and the second frequency subband; and the first information is transmitted via an air interface.

The present disclosure provides a base station for wireless communication, wherein the base station includes:

a first transmitter, to transmit a first-type radio signal in one of a first time-frequency resource pool and a second time-frequency resource pool.

Herein, the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; a receiver of the first-type radio signal includes a first terminal; and the Q1 is a positive integer.

In one embodiment, the above base station for wireless communication is characterized in that: the first transmitter further transmits R1 first-type signalings in R1 first-type time units of Q1 first-type time units respectively; the R1 first-type time units correspond to R1 first time-frequency resource subpools of the Q1 first time-frequency resource subpools respectively; monitorings for the R1 first-type signalings in the Q1 first-type time units by the first terminal is used by the first terminal to determine whether the Q1 first time-frequency resource subpools are occupied; and the R1 is a positive integer not greater than the Q1.

In one embodiment, the above base station for wireless communication is characterized in that: the first transmitter further transmits the first-type radio signal in a third time-frequency resource pool; the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool includes a corresponding third time-frequency resource subpool.

In one embodiment, the above base station for wireless communication is characterized in that: the first transmitter further transmits P1 second-type signalings in P1 second-type time units of Q1 second-type time units respectively; the P1 second-type time units correspond to P1 second time-frequency resource subpools of the Q1 second time-frequency resource subpools respectively; monitorings for the P1 second-type signalings in the Q1 second-type time units by the first terminal is used by the first terminal to determine whether the Q1 second time-frequency resource subpools are occupied; and the P1 is a positive integer not greater than the Q1.

In one embodiment, the above base station for wireless communication further includes a second transceiver; the second transceiver transmits a second radio signal; the first-type radio signal includes first configuration information, the first configuration information is applicable to the second radio signal, and the first configuration information includes at least one among occupied frequency domain resources, an MCS, and a HARQ process number; and the first-type radio signal is a physical layer signaling.

In one embodiment, the above base station for wireless communication further includes a second transceiver; the second transceiver receives a third radio signal; the first-type radio signal includes second configuration information, the second configuration information is applicable to the third radio signal, and the second configuration information includes at least one among occupied frequency domain resources, an MCS, and a HARQ process number; and the second-type radio signal is a physical layer signaling.

In one embodiment, the above base station for wireless communication is characterized in that: the first-type radio signal includes paging relevant information.

In one embodiment, the above base station for wireless communication is characterized in that: the first transmitter further transmits first information; the first information is used for determining a first frequency subband set, and the first frequency subband set includes the first frequency subband and the second frequency subband; and the first information is transmitted via an air interface.

In one embodiment, compared with conventional schemes, the present disclosure has the following benefits.

The first-type radio signal is transmitted on the first frequency subband and the second frequency subband, and candidate time domain transmitting positions correspond to the Q1 first time-frequency resource subpools and the Q1 second time-frequency resource subpools respectively. The above scheme increases transmission opportunities of the first-type radio signal in time unit. When the transmission on one frequency subband cannot be carried out due to an LBT failure, the UE carries out monitoring on another frequency subband. The transmission opportunities of the first-type radio signal are increased and the transmission delay of the first-type radio signal is reduced.

Whether any one of the first time-frequency resource subpools is occupied is used for determining whether the second time-frequency resource pool includes a corresponding second time-frequency resource subpool, thus the UE can determine whether the first-type radio signal is not detected because the LBT fails or because the base station just does not transmit the first-type radio signal, depending on whether the first time-frequency resource subpool is occupied. Therefore, the UE will not misjudge the situation that the base station just does not transmit the first-type radio signal as the situation that the base station does not transmit the first-type radio signal due to the LBT failure, and avoids blind switch to another frequency subband to search for the first-type radio signal. The above mechanism ensures the stability and robustness of the UE searching for the first-type radio signal on multiple frequency subbands.

Through the monitoring of the first-type signaling, the UE determines which of the Q1 first time-frequency resource subpools are occupied. For those given first time-frequency resource subpools which are occupied, but on which the first-type radio signal is not detected, the UE will not subsequently switch to the second time-frequency resource subpools corresponding to the given first time-frequency resource subpools to monitor the first-type radio signal. The above method improves the transmission efficiency of the first-type radio signal and prevents the UE switching back and forth among multiple frequency subbands frequently to receive the first-type radio signal By configuring the first frequency subband set, the UE monitors the first-type radio signal in the first frequency subband set, to further increase the transmission opportunities of the first-type radio signal.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
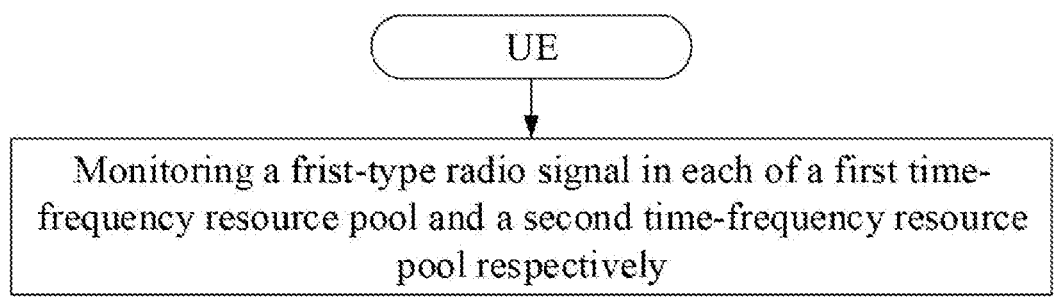
FIG. 1 is a flowchart of a first-type radio signal according to one embodiment of the present disclosure.

Embodiment 1 illustrates an example of a flowchart of a first-type radio signal, as shown in FIG. 1.

In Embodiment 1, the UE in the present disclosure monitors a first-type radio signal in each of a first time-frequency resource pool and a second time-frequency resource pool respectively; the first time-frequency resource pool and the second time-frequency resource pool are located on a first frequency subband and a second frequency subband respectively; the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; and the Q1 is a positive integer.

In one subembodiment, the first frequency subband and the second frequency subband are orthogonal in frequency domain.

In one affiliated embodiment of the above subembodiment, the first frequency subband and the second frequency subband being orthogonal in frequency domain refers that: frequency domain resources occupied by the first frequency subband are not overlapping with frequency domain resources occupied by the second frequency subband.

In one affiliated embodiment of the above subembodiment, the first frequency subband and the second frequency subband being orthogonal in frequency domain refers that: there is no subcarrier that belongs to both the first frequency subband and the second frequency subband.

In one subembodiment, the first frequency subband and the second frequency subband are partially orthogonal in frequency domain.

In one affiliated embodiment of the above subembodiment, the first frequency subband and the second frequency subband being partially orthogonal in frequency domain refers that: frequency domain resources occupied by the first frequency subband are partially overlapping with frequency domain resources occupied by the second frequency subband.

In one affiliated embodiment of the above subembodiment, the first frequency subband and the second frequency subband being partially orthogonal in frequency domain refers that: there is at least one subcarrier that belongs to both the first frequency subband and the second frequency subband, and there is at least another subcarrier that does not belong to both the first frequency subband and the second frequency subband.

In one subembodiment, if any one first time-frequency resource subpool of the Q1 first time-frequency resource subpools is occupied, the second time-frequency resource pool does not include a corresponding second time-frequency resource subpool; otherwise, the second time-frequency resource pool includes a corresponding second time-frequency resource subpool.

In one subembodiment, the UE determines, through an energy detection approach, whether each first time-frequency resource subpool of the Q1 first time-frequency resource subpools is occupied.

In one subembodiment, the first time-frequency resource pool consists of Q2 first time-frequency resource subpools, the Q2 first time-frequency resource subpools include the Q1 first time-frequency resource subpools, and the (Q2−Q1) first time-frequency resource subpools among the Q2 first time-frequency resource subpools, other than the Q1 first time-frequency resource subpools, are unrelated to the Q1 second time-frequency resource subpools; and the Q2 is a positive integer not less than Q1.

In one subembodiment, the positions of the Q1 first time-frequency resource subpools in time domain are related to an ID of the UE.

In one affiliated embodiment of the above subembodiment, the user ID is at least one of S-TMSI (SAE Temporary Mobile Subscriber Identity) and IMSI, wherein SAE represents System Architecture Evolution.

In one affiliated embodiment of the above subembodiment, the user ID is an International Mobile Subscriber Identification Number (IMSI).

In one subembodiment, the Q1 first time-frequency resource subpools are periodically distributed in time domain.

In one subembodiment, the positions of the Q1 first time-frequency resource subpools in time domain all correspond to Paging Occasions (POs) of the UE on the first frequency subband.

In one subembodiment, the positions of the Q1 first time-frequency resource subpools in time domain are related to a time domain position of a target radio signal detected on the first frequency subband by the UE.

In one affiliated embodiment of the above subembodiment, the target radio signal includes a synchronization signal.

In an example of the affiliated embodiment, the synchronization signal is specific to the first frequency subband.

In one affiliated embodiment of the above subembodiment, the target radio signal includes a Physical Broadcasting Channel (PBCH).

In an example of the affiliated embodiment, the PBCH is specific to the first frequency subband.

In one subembodiment, a first time-frequency resource subpool #i corresponds to a second time-frequency resource subpool #i, the first time-frequency resource subpool #i is a first time-frequency resource subpool of the Q1 first time-frequency resource subpools which is corresponding to the second time-frequency resource subpool #i, and the second time-frequency resource subpool #i is the ith one of the Q1 second time-frequency resource subpools; the i is a positive integer greater than 0 but not greater than Q1; and the position of the second time-frequency resource subpool #i in time domain is related to the position of the first time-frequency resource subpool #i in time domain.

In one affiliated embodiment of the above subembodiment, the position of the first time-frequency resource subpool #i in time domain being related to the position of the second time-frequency resource subpool #i in time domain refers that: the first time-frequency resource subpool #i is located on a slot #K1, the second time-frequency resource subpool #i is located on a slot #K2, the K1 is a positive integer, the K2 is a positive integer greater than the K1, the difference between the K2 and the K1 is fixed, or the difference between the K2 and the K1 is configured through an RRC signaling.

In one subembodiment, the first-type radio signal includes a PBCH.

In one subembodiment, the first-type radio signal is used for scheduling system broadcast information.

In one subembodiment, at least one unoccupied multicarrier symbol exists between any two first time-frequency resource subpools of the Q1 first time-frequency resource subpools.

In one subembodiment, at least one unoccupied multicarrier symbol exists between any two second time-frequency resource subpools of the Q1 second time-frequency resource subpools.

Embodiment 2

Figure 2:
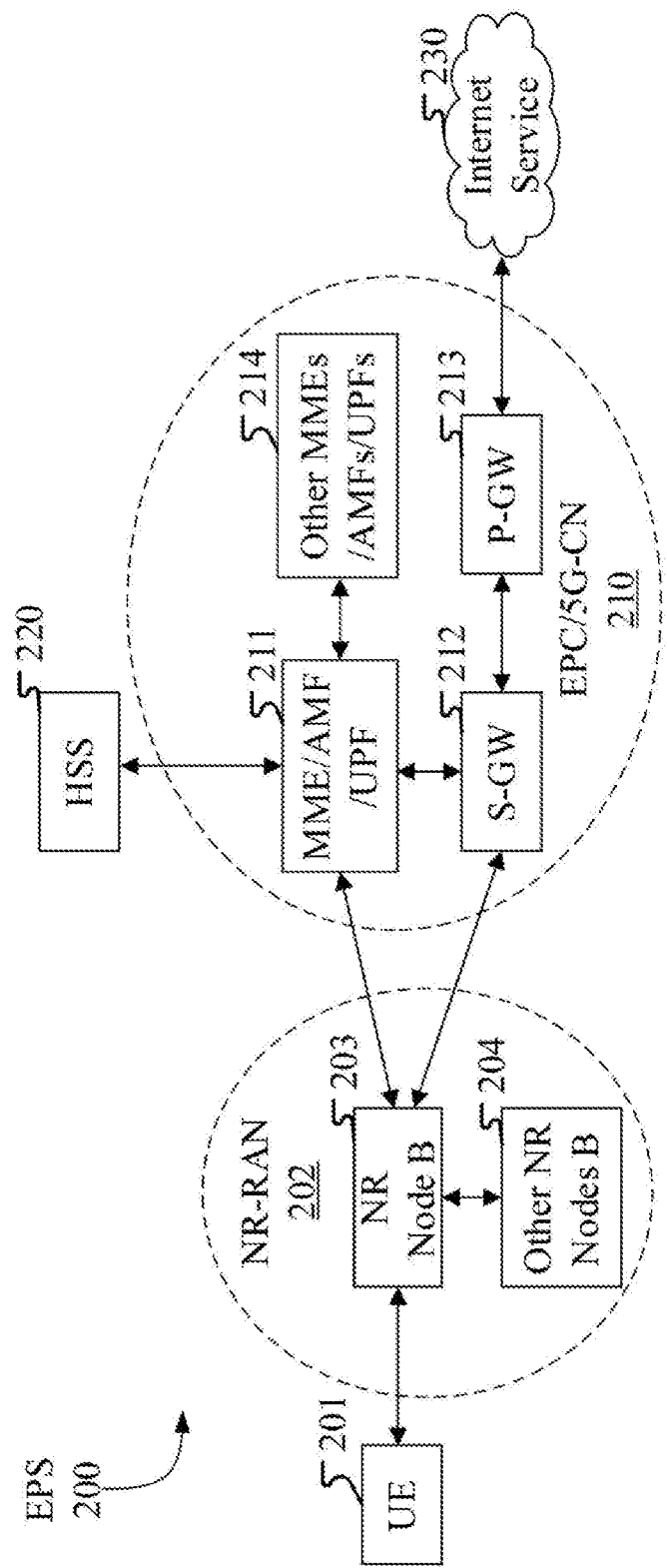
FIG. 2 is a diagram illustrating a network architecture according to one embodiment of the present disclosure.

Embodiment 2 illustrates an example of a diagram of a network architecture, as shown in FIG. 2.

Embodiment 2 illustrates an example of a diagram of a network architecture according to the present disclosure, as shown in FIG. 2. FIG. 2 is a diagram illustrating a network architecture 200 of NR 5G, Long-Term Evolution (LTE), Long-Term Evolution Advanced (LTE-A) systems. The NR 5G or LTE network architecture 200 may be called an Evolved Packet System (EPS) 200 or some other appropriate terms. The EPS 200 may include one or more UEs 201, an NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS provides packet switching services. Those skilled in the art are easy to understand that various concepts presented throughout the present disclosure may be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistants (PDAs), Satellite Radios, non-terrestrial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and Packet Switching Streaming Services (PSSs).

In one subembodiment, the UE 201 corresponds to the UE in the present disclosure.

In one subembodiment, the gNB 203 corresponds to the base station in the present disclosure.

In one subembodiment, the UE 201 supports wireless communication of data transmission on unlicensed spectrums.

In one subembodiment, the gNB 203 supports wireless communication of data transmission on unlicensed spectrums.

In one subembodiment, the UE 201 supports wireless communication in aggregation of multiple frequency domain resources.

In one subembodiment, the gNB 203 supports wireless communication in aggregation of multiple frequency domain resources.

In one affiliated embodiment of the above two subembodiments, the aggregation in the present disclosure refers to being aggregated.

In one affiliated embodiment of the above two subembodiments, the frequency domain resources in the present disclosure refers to a carrier.

In one affiliated embodiment of the above two subembodiments, the frequency domain resources in the present disclosure refers to a Bandwidth Part (BWP).

Embodiment 3

Figure 3:
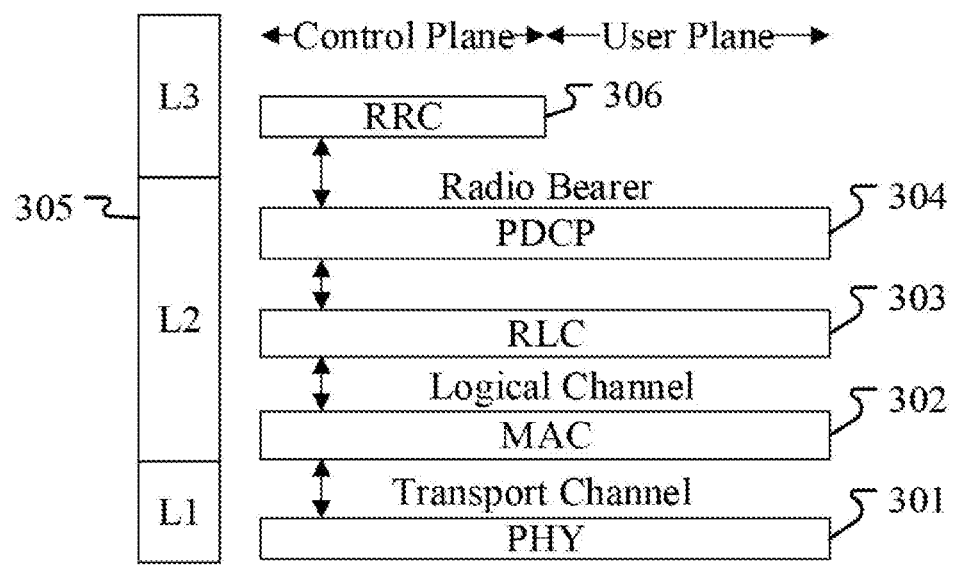
FIG. 3 is a diagram illustrating an embodiment of a radio protocol architecture of a user plane and a control plane according to one embodiment of the present disclosure.

Embodiment 3 illustrates a diagram of an embodiment of a radio protocol architecture of a user plane and a control plane according to the present disclosure, as shown in FIG. 3.

FIG. 3 is a diagram illustrating an embodiment of a radio protocol architecture of a user plane and a control plane. In FIG. 3, the radio protocol architecture of a UE and a base station device (gNB or eNB) is represented by three layers, which are a layer 1, a layer 2 and a layer 3 respectively. The layer 1 (L1) is the lowest layer and performs signal processing functions of various PHY layers. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may have several higher layers above the L2 305, including a network layer (i.e. IP layer) terminated at the P-GW of the network side and an application layer terminated at the other side (i.e. a peer UE, a server, etc.) of the connection. The PDCP sublayer 304 provides multiplexing among variable radio bearers and logical channels. The PDCP sublayer 304 also provides a header compression for a higher-layer packet so as to reduce the radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station in the present disclosure.

In one subembodiment, the first-type radio signal in the present disclosure is generated by the RRC sublayer 306.

In one subembodiment, the first-type radio signal in the present disclosure includes Non-Access Stratum (NAS) information.

In one subembodiment, the first-type radio signal in the present disclosure is generated by the PHY 301, and the second radio signal includes NAS information.

In one subembodiment, the third radio signal in the present disclosure is generated by the MAC sublayer 302.

In one subembodiment, the first-type signaling in the present disclosure is generated by the PHY 301.

In one subembodiment, the second-type signaling in the present disclosure is generated by the PHY 301.

In one subembodiment, the first information in the present disclosure is generated by the RRC sublayer 306.

Embodiment 4

Figure 4:
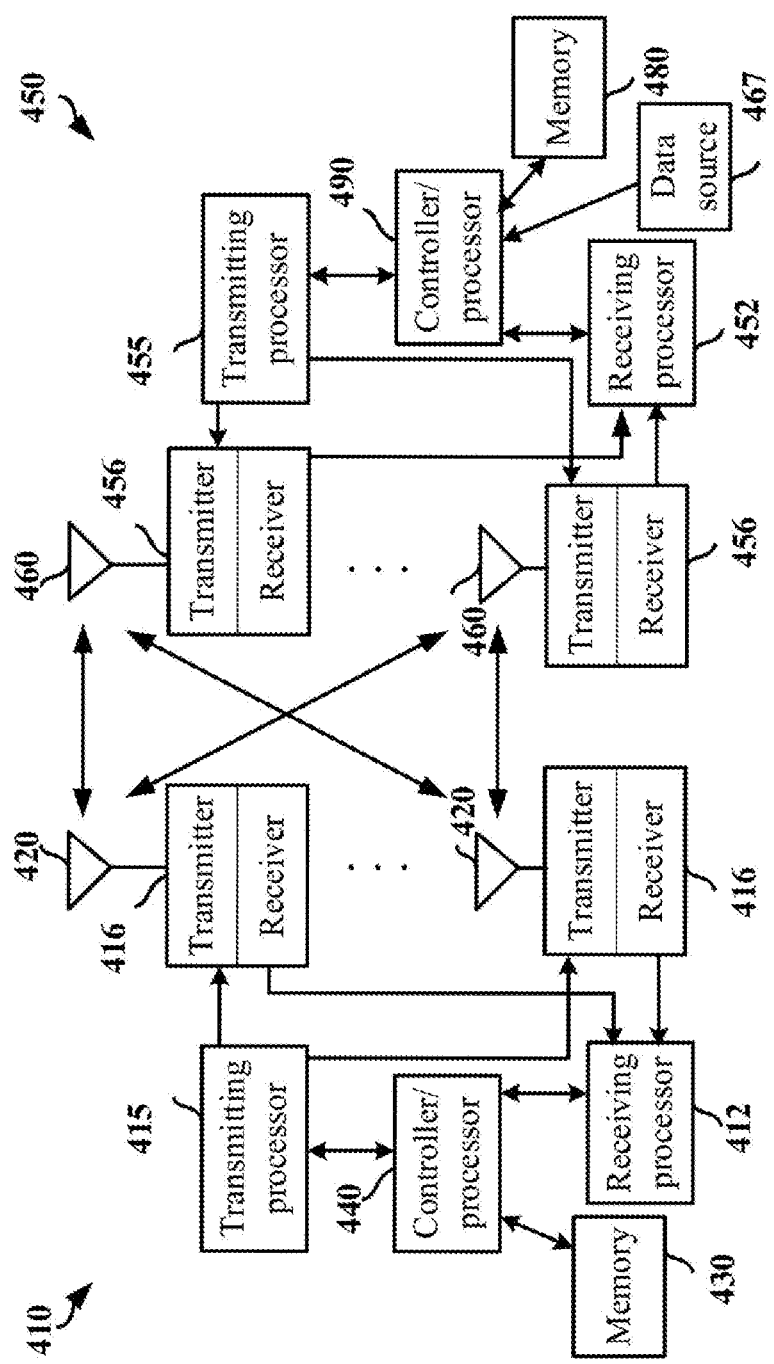
FIG. 4 is a diagram illustrating an evolved node B and a UE according to one embodiment of the present disclosure.

Embodiment 4 illustrates a diagram of a base station and a UE according to the present disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In Uplink (UL) transmission, processes relevant to the base station 410 include the following.

The receiver 416 receives a radio-frequency signal via the corresponding antenna 420, converts the received radio-frequency signal into a baseband signal, and provides the baseband signal to the receiving processor 412.

The receiving processor 412 performs signal receiving processing functions of an L1 layer (that is, PHY), including decoding, de-interleaving, descrambling, demodulation, extraction of physical layer control signaling, etc.

The controller/processor 440 performs functions of an L2 layer, and is connected to the memory 43 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 is then provided to a core network.

The controller/processor 440 determines to transmit a first-type radio signal in one of a first time-frequency resource pool and a second time-frequency resource pool.

In UL transmission, processes relevant to the UE 450 include the following.

The data source 467 provides a higher-layer packet to the controller/processor 490. The data source 467 represents all protocol layers above the L2 layer.

The transmitter 456 transmits a radio-frequency signal via the corresponding antenna 460, converts a baseband signal into a radio-frequency signal and provides the radio-frequency signal to the corresponding antenna 460.

The transmitting processor 455 receives a bit stream output from the controller/processor 490, and performs signal transmitting processing functions of an L1 layer (that is, PHY), including encoding, interleaving, scrambling, modulation, power control/allocation, generation of physical layer control signaling (including PRACH, PUCCH, PUSCH, reference signal), etc.

The controller/processor 490 performs header compression, encryption, packet segmentation and reordering, and multiplexing between a logical channel and a transport channel based on the radio resource allocation of the gNB 410, and performs functions of the layer 2 of the user plane and the control plane.

The controller/processor 490 is also in charge of HARQ operation, retransmission of a lost packet, and the signaling to the eNB 410.

The controller/processor 490 determines to monitor a first-type radio signal in each of a first time-frequency resource pool and a second time-frequency resource pool respectively.

In Downlink (DL) transmission, processes relevant to the base station 410 include the following.

A packet from a higher layer is provided to the controller/processor 440. The controller/processor 440 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule aerial resources corresponding to transmission requirements.

The controller/processor 440 determines to transmit a first-type radio signal in one of a first time-frequency resource pool and a second time-frequency resource pool.

The transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs signal receiving processing functions of an L1 layer (that is, PHY), including decoding, de-interleaving, descrambling, demodulation, extraction of physical layer control signaling, etc.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 determines to monitor a first-type radio signal in each of a first time-frequency resource pool and a second time-frequency resource pool respectively.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least monitors a first-type radio signal in each of a first time-frequency resource pool and a second time-frequency resource pool respectively; wherein the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; and the Q1 is a positive integer.

In one subembodiment, the UE 450 includes a memory that stores a computer readable instruction program. The computer readable instruction program generates an action when executed by at least one processor. The action includes: monitoring a first-type radio signal in each of a first time-frequency resource pool and a second time-frequency resource pool respectively; wherein the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; and the Q1 is a positive integer.

In one subembodiment, the gNB 410 includes at least one processor and at least one memory. The at least one memory includes computer program codes. The at least one memory and the computer program codes are configured to be used in collaboration with the at least one processor. The gNB 410 at least transmits a first-type radio signal in one of a first time-frequency resource pool and a second time-frequency resource pool; wherein the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; a receiver of the first-type radio signal includes a first terminal; and the Q1 is a positive integer.

In one subembodiment, the gNB 410 includes a memory that stores a computer readable instruction program. The computer readable instruction program generates an action when executed by at least one processor. The action includes: transmitting a first-type radio signal in one of a first time-frequency resource pool and a second time-frequency resource pool; wherein the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; a receiver of the first-type radio signal includes a first terminal; and the Q1 is a positive integer.

In one subembodiment, the UE 450 corresponds to the UE in the present disclosure.

In one subembodiment, the gNB 410 corresponds to the base station in the present disclosure.

In one subembodiment, the controller/processor 490 is used for determining to monitor the first-type radio signal in a third time-frequency resource pool.

In one subembodiment, at least the former two of the receiver 456, the receiving processor 452, and the controller/processor 490 are used for monitoring a first-type radio signal in each of a first time-frequency resource pool and a second time-frequency resource pool respectively.

In one subembodiment, at least the former two of the receiver 456, the receiving processor 452, and the controller/processor 490 are used for monitoring a first-type signaling in each of Q1 first-type time units respectively.

In one subembodiment, at least the former two of the receiver 456, the receiving processor 452, and the controller/processor 490 are used for monitoring the first-type radio signal in a third time-frequency resource pool.

In one subembodiment, at least the former two of the receiver 456, the receiving processor 452, and the controller/processor 490 are used for monitoring a second-type signaling in each of Q1 second-type time units respectively.

In one subembodiment, at least the former two of the receiver 456, the receiving processor 452, and the controller/processor 490 are used for receiving a second radio signal.

In one subembodiment, at least the former two of the transmitter 456, the transmitting processor 455, and the controller/processor 490 are used for transmitting a third radio signal.

In one subembodiment, at least the former two of the receiver 456, the receiving processor 452, and the controller/processor 490 are used for receiving first information.

In one subembodiment, the controller/processor 440 is used for determining to transmit a first-type radio signal in one of a first time-frequency resource pool and a second time-frequency resource pool.

In one subembodiment, the controller/processor 440 is used for determining to transmit the first-type radio signal in a third time-frequency resource pool.

In one subembodiment, at least the former two of the transmitter 416, the transmitting processor 415, and the controller/processor 440 are used for transmitting a first-type radio signal in one of a first time-frequency resource pool and a second time-frequency resource pool.

In one subembodiment, at least the former two of the transmitter 416, the transmitting processor 415, and the controller/processor 440 are used for transmitting R1 first-type signalings in R1 first-type time units of Q1 first-type time units respectively.

In one subembodiment, at least the former two of the transmitter 416, the transmitting processor 415, and the controller/processor 440 are used for transmitting the first-type radio signal in a third time-frequency resource pool.

In one subembodiment, at least the former two of the transmitter 416, the transmitting processor 415, and the controller/processor 440 are used for transmitting P1 second-type signalings in P1 second-type time units of Q1 second-type time units respectively.

In one subembodiment, at least the former two of the transmitter 416, the transmitting processor 415, and the controller/processor 440 are used for transmitting a second radio signal.

In one subembodiment, at least the former two of the receiver 416, the receiving processor 412, and the controller/processor 440 are used for receiving a third radio signal.

In one subembodiment, at least the former two of the transmitter 416, the transmitting processor 415, and the controller/processor 440 are used for transmitting first information.

Embodiment 5

Figure 5:
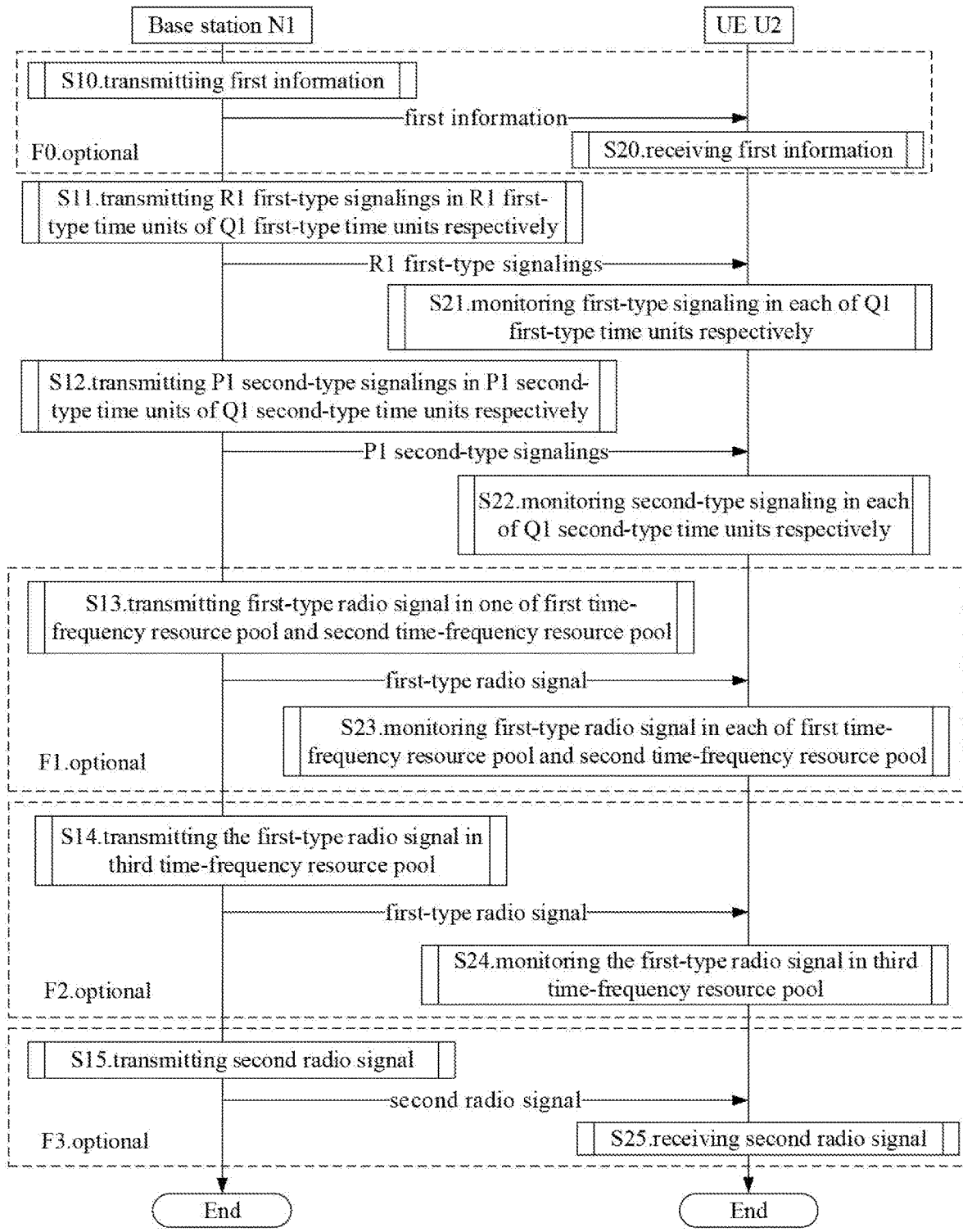
FIG. 5 is a flowchart of a first-type signaling according to one embodiment of the present disclosure.

Embodiment 5 illustrates an example of a flowchart of a first signaling, as shown in FIG. 5. In FIG. 5, the base station N1 is a maintenance base station for a serving cell of the UE U2. In FIG. 5, steps in boxes marked by F0, F1, F2 and F3 are optional.

The base station N1 transmits first information in S10, transmits R1 first-type signalings in R1 first-type time units of Q1 first-type time units respectively in S11, transmits P1 second-type signalings in P1 second-type time units of Q1 second-type time units respectively in S12, transmits a first-type radio signal in one of a first time-frequency resource pool and a second time-frequency resource pool in S13, transmits the first-type radio signal in a third time-frequency resource pool in S14, and transmits a second radio signal in S15.

The UE U2 receives first information in S20, monitors a first-type signaling in each of Q1 first-type time units respectively in S21, monitors a second-type signaling in each of Q1 second-type time units respectively in S22, monitors a first-type radio signal in each of a first time-frequency resource pool and a second time-frequency resource pool respectively in S23, monitors the first-type radio signal in a third time-frequency resource pool in S24, and receives a second radio signal in S25.

In Embodiment 5, the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; the Q1 is a positive integer; the monitoring for the first-type signaling by the UE U2 is used for determining whether a given first time-frequency resource subpool is occupied by the base station N1, and the given first time-frequency resource subpool is a first time-frequency resource subpool of the Q1 first time-frequency resource subpools which is corresponding to the first-type signaling; the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied by the base station N1 is used for determining whether the third time-frequency resource pool includes a corresponding third time-frequency resource subpool; the monitoring for the second-type signaling is used by the UE U2 to determine whether a given second time-frequency resource subpool is occupied the base station N1, and the given second time-frequency resource subpool is a second time-frequency resource subpool of the Q1 second time-frequency resource subpools which is corresponding to the second-type signaling; the first-type radio signal includes first configuration information, the first configuration information is applicable to the second radio signal, and the first configuration information includes at least one among occupied frequency domain resources, an MCS, and a HARQ process number; the first-type radio signal is a physical layer signaling; the first information is used for determining a first frequency subband set, and the first frequency subband set includes the first frequency subband and the second frequency subband; the first information is transmitted via an air interface; the R1 first-type time units correspond to R1 first time-frequency resource subpools of the Q1 first time-frequency resource subpools respectively; the R1 is a positive integer not greater than the Q1; the P1 second-type time units correspond to P1 second time-frequency resource subpools of the Q1 second time-frequency resource subpools respectively; and the P1 is a positive integer not greater than the Q1.

In one subembodiment, a given first-type time unit is a first-type time unit of the Q1 first-type time units which is corresponding to the given first time-frequency resource subpool, the UE U2 detects the first-type signaling in the given first-type time unit, and the UE U2 determines that the given first time-frequency resource subpool is occupied.

In one subembodiment, a given first-type time unit is a first-type time unit of the Q1 first-type time units which is corresponding to the given first time-frequency resource subpool, the UE U2 does not detect the first-type signaling in the given first-type time unit, and the UE U2 determines that the given first time-frequency resource subpool is not occupied.

In one subembodiment, the base station N1 transmits R1 first-type signalings in R1 first-type time units of the Q1 first-type time units respectively, and the UE U2 detects the R1 first-type signalings in the Q1 first-type time units; the UE U2 determines that R1 first time-frequency resource subpools of the Q1 first time-frequency resource subpools which are corresponding to the R1 first-type time units are occupied; and the R1 is a positive integer not greater than the Q1.

In one subembodiment, the monitoring for the first-type signaling is carried out on the first frequency subband.

In one subembodiment, the monitoring in the present disclosure refers to energy detection; if a received energy is greater than a given threshold, the UE U2 considers that the signaling is detected; if a received energy is less than the given threshold, the UE U2 considers that the signaling is not detected.

In one affiliated embodiment of the above subembodiment, the monitoring is carried for the first-type signaling in the present disclosure.

In one affiliated embodiment of the above subembodiment, the monitoring is carried for the second-type signaling in the present disclosure.

In one subembodiment, the monitoring in the present disclosure refers to a CRC check; if a CRC included in a received radio signal passes check, the UE U2 considers that the radio signal is detected; if a CRC included in a received radio signal does not pass check, the UE U2 considers that the radio signal is not detected.

In one affiliated embodiment of the above subembodiment, the monitoring is carried for the first-type signaling in the present disclosure.

In one affiliated embodiment of the above subembodiment, the monitoring is carried for the second-type signaling in the present disclosure.

In one affiliated embodiment of the above subembodiment, the monitoring is carried for the first-type radio signal in the present disclosure.

In one subembodiment, the UE U2 determines, through the energy detection approach, whether each second time-frequency resource subpool of the Q1 second time-frequency resource subpools is occupied.

In one subembodiment, the second frequency subband and the third frequency subband are orthogonal in frequency domain.

In one subembodiment, the first frequency subband and the third frequency subband are orthogonal in frequency domain.

In one subembodiment, a second time-frequency resource subpool #i corresponds to a third time-frequency resource subpool #i, the second time-frequency resource subpool #i is the ith one of the Q1 second time-frequency resource subpools, and the third time-frequency resource subpool #i is the ith one of the Q1 third time-frequency resource subpools; the i is a positive integer greater than 0 but not greater than Q1; and the position of the second time-frequency resource subpool #i in time domain is related to the position of the third time-frequency resource subpool #i in time domain.

In one affiliated embodiment of the above subembodiment, the position of the second time-frequency resource subpool #i in time domain being related to the position of the third time-frequency resource subpool #i in time domain refers that: the second time-frequency resource subpool #i is located on a slot #K2, the third time-frequency resource subpool #i is located on a slot #K3, the K2 is a positive integer, the K3 is a positive integer greater than the K2, the difference between the K3 and the K2 is fixed, or the difference between the K3 and the K2 is configured through an RRC signaling.

In one subembodiment, at least one unoccupied multicarrier symbol exists between any two third time-frequency resource subpools of the Q1 third time-frequency resource subpools.

In one subembodiment, the multicarrier symbol in the present disclosure is one of Orthogonal Frequency Division Multiplexing (OFDM) symbols, Single-Carrier Frequency Division Multiple Access (SC-FDMA) symbols, Filter Bank Multi Carrier (FBMC) symbols, OFDM symbols including Cyclic Prefixes (CPs), Discrete Fourier Transform Spreading Orthogonal Frequency Division Multiplexing (DFT-s-OFDM) symbols including CPs.

In one subembodiment, a given second-type time unit is a second-type time unit of the Q1 second-type time units which is corresponding to the given second time-frequency resource subpool, the UE U2 detects the second-type signaling in the given second-type time unit, and the UE U2 determines that the given second time-frequency resource subpool is occupied.

In one subembodiment, a given second-type time unit is a second-type time unit of the Q1 second-type time units which is corresponding to the given second time-frequency resource subpool, the UE U2 does not detect the second-type signaling in the given second-type time unit, and the UE U2 determines that the given second time-frequency resource subpool is not occupied.

In one subembodiment, the base station N1 transmits P1 second-type signalings in P1 second-type time units of the Q1 second-type time units respectively, and the UE U2 detects the P1 second-type signalings in the Q1 second-type time units; the UE U2 determines that P1 second time-frequency resource subpools of the Q1 second time-frequency resource subpools which are corresponding to the P1 second-type time units are occupied; and the P1 is a positive integer not greater than the Q1.

In one subembodiment, the monitoring for the second-type signaling is carried out on the second frequency subband.

In one subembodiment, the first-type signaling is a dynamic signaling.

In one subembodiment, the second-type signaling is a dynamic signaling.

In one affiliated embodiment of the above two subembodiments, the dynamic signaling is Downlink Control Information (DCI).

In one affiliated embodiment of the above two subembodiments, the dynamic signalings are all marked by given identities.

In an example of the affiliated embodiment, the given identity is used for generating a Reference Signal (RS) sequence of a Demodulation Reference Signal (DMRS) corresponding to the dynamic signaling.

In an example of the affiliated embodiment, the dynamic signalings being all marked by given identities refers that: a target dynamic signaling is any one of the Q1 dynamic signalings, and a Cyclic Redundancy Check (CRC) included in the target dynamic signaling is scrambled by a given identity.

In an example of the affiliated embodiment, the given identity is 16 binary bits.

In an example of the affiliated embodiment, the given identity is totally used for the scrambling of the dynamic signaling.

In an example of the affiliated embodiment, the given identity is a Common Control Radio Network Temporary Identifier (CC-RNTI).

In an example of the affiliated embodiment, the given identity is used for marking a dynamic signaling corresponding to the given identity, and the corresponding dynamic signaling is used for indicating that a positive integer number of multicarrier symbols are occupied by the base station N1.

In an example of the affiliated embodiment, the given identity is used for marking a dynamic signaling corresponding to the given identity, and the corresponding dynamic signaling is used for indicating that a positive integer number of slots are occupied by the base station N1.

In an example of the affiliated embodiment, the given identity is used for determining a search space corresponding to the dynamic signaling, the search space includes a plurality of Resource Element (RE) groups, REs occupied by corresponding indicator information are one RE group of the plurality of RE groups, and the RE group includes a plurality of REs.

In an example of the affiliated embodiment, the given identity is cell-specific.

In an example of the affiliated embodiment, the given identity is terminal group-specific, and the UE U2 is one terminal in the terminal group.

In one subembodiment, the first-type signalings are all cell-specific.

In one subembodiment, the second-type signalings are all cell-specific.

In one subembodiment, the first-type radio signal is a downlink grant.

In one subembodiment, the first-type radio signal is a scheduling signaling for the second radio signal.

In one subembodiment, the first-type radio signal includes paging relevant information.

In one affiliated embodiment of the above subembodiment, the first-type radio signal is used for scheduling a given Physical Downlink Shared Channel (PDSCH), and the given PDSCH is used for transmitting paging relevant information.

In one affiliated embodiment of the above subembodiment, the paging relevant information is used for transmitting a paging request to the UE U2.

In one affiliated embodiment of the above subembodiment, the UE U2 is in RRC Idle state.

In one affiliated embodiment of the above subembodiment, the UE U2 is in RRC Inactive state.

In one affiliated embodiment of the above subembodiment, the paging relevant information is used for notifying system information changes to the UE U2.

In one affiliated embodiment of the above subembodiment, the paging relevant information is used for notifying the UE U2 to receive Earthquake and Tsunami Warning System (ETWS) relevant information.

In one affiliated embodiment of the above subembodiment, the paging relevant information is used for notifying the UE U2 to receive Commercial Mobile Alert Service (CMAS) relevant information.

In one subembodiment, the first frequency subband set includes a third frequency subband.

In one subembodiment, the first frequency subband set includes a positive integer number of frequency subbands, the first frequency subband and the second frequency subband both belong to the positive integer number of frequency subbands.

In one affiliated embodiment of the above subembodiment, the UE U2 monitors the first-type radio signal on the positive integer number of frequency subbands.

In one subembodiment, the air interface is wireless.

In one subembodiment, the air interface includes a wireless channel.

In one subembodiment, the air interface is an interface between the base station N1 and the UE U2.

In one subembodiment, the air interface is a Uu interface.

In one subembodiment, the air interface corresponds to a wireless channel between the UE 201 and the NR Node B 203 shown in FIG. 2.

In one subembodiment, the base station N1 transmits the first-type radio signal in a given third time-frequency resource subpool in a third time-frequency resource pool, the given third time-frequency resource subpool corresponds to a given second time-frequency resource subpool, and the given second time-frequency resource subpool corresponds to a given first time-frequency resource subpool; the base station N1 does not transmit the first-type radio signal in the given second time-frequency resource subpool, and the base station N1 does not transmit the first-type radio signal in the given first time-frequency resource subpool.

In one affiliated embodiment of the above subembodiment, the base station N1 does not occupy the given second time-frequency resource subpool.

In one affiliated embodiment of the above subembodiment, the base station N1 does not occupy the given first time-frequency resource subpool.

In one affiliated embodiment of the above subembodiment, the base station N1 does not transmit a first-type signaling in a first-type time unit corresponding to the given first time-frequency resource subpool.

In one affiliated embodiment of the above subembodiment, the base station N1 does not transmit a second-type signaling in a second-type time unit corresponding to the given second time-frequency resource subpool.

In one subembodiment, the second time-frequency resource pool and the third time-frequency resource pool are orthogonal in time domain.

In one subembodiment, the first-type time unit in the present disclosure occupies a positive integer number of multicarrier symbols.

In one subembodiment, the second-type time unit in the present disclosure occupies a positive integer number of multicarrier symbols.

In one subembodiment, the first-type time unit in the present disclosure occupies a slot.

In one subembodiment, the second-type time unit in the present disclosure occupies a slot.

Embodiment 6

Figure 6:
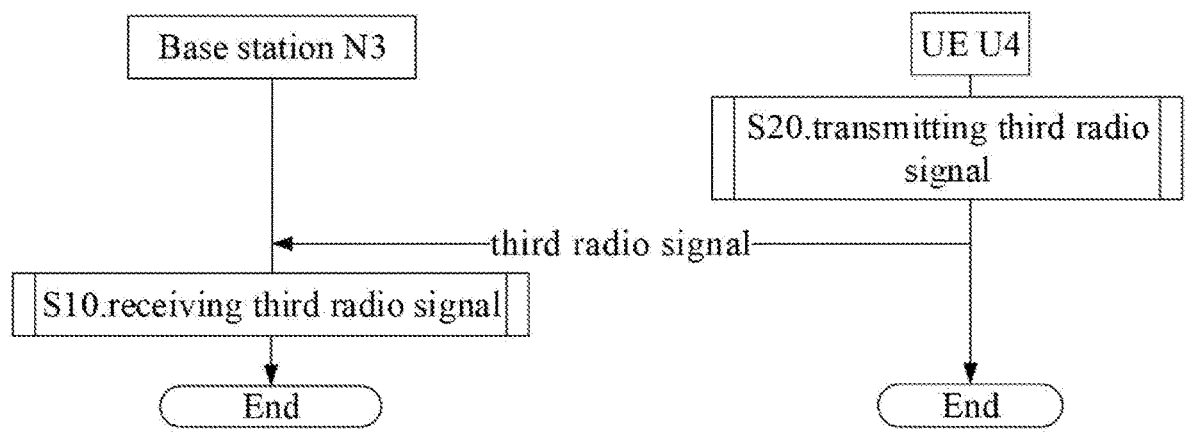
FIG. 6 is a flowchart of a third radio signal according to one embodiment of the present disclosure.

Embodiment 6 illustrates an example of a flowchart of a third radio signal, as shown in FIG. 6. In FIG. 6, the base station N3 is a maintenance base station for a serving cell of the UE U4.

The base station N3 receives a third radio signal in S30.

The UE U4 transmits a third radio signal in S40.

In Embodiment 6, the first-type radio signal includes second configuration information, the second configuration information is applicable to the third radio signal, and the second configuration information includes at least one among occupied frequency domain resources, an MCS, and a HARQ process number; and the second-type radio signal is a physical layer signaling.

In one subembodiment, the first-type radio signal is an uplink grant.

In one subembodiment, the first-type radio signal is a scheduling signaling for the third radio signal.

Embodiment 7

Figure 7:
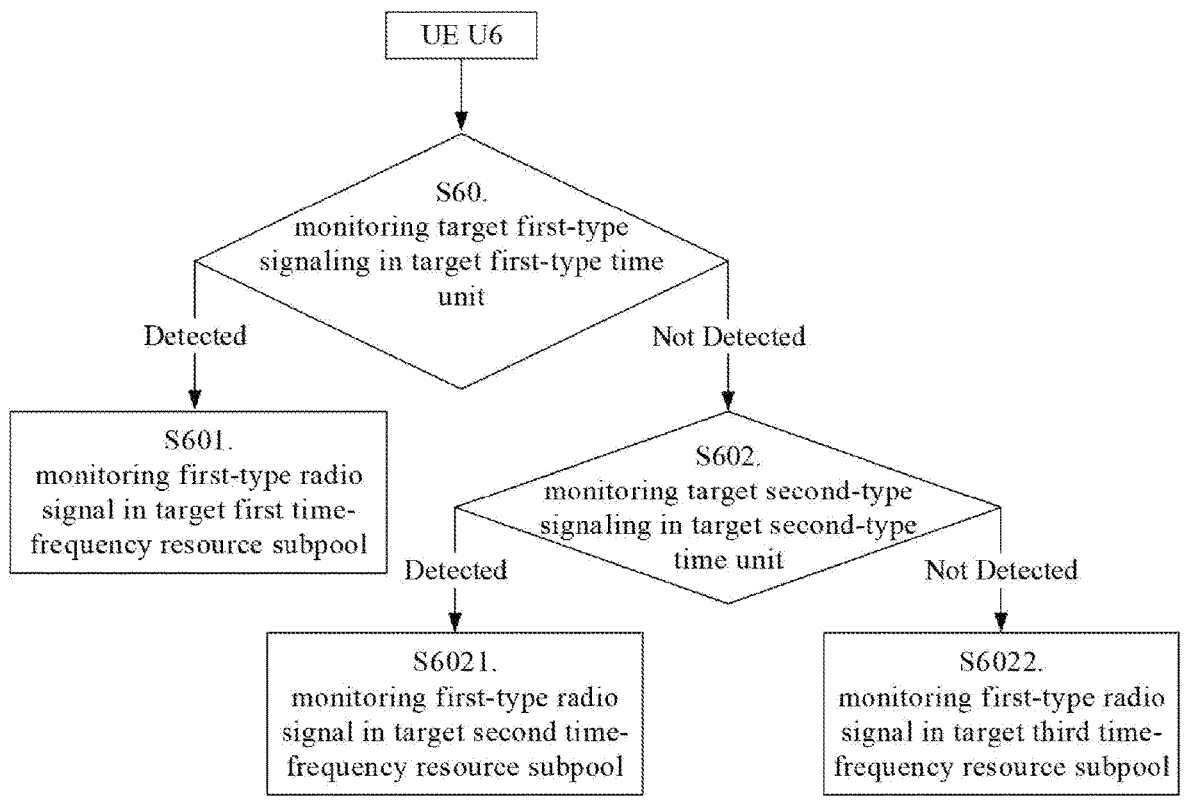
FIG. 7 is a step diagram of a target first-type signaling and a target second-type signaling according to one embodiment of the present disclosure.

Embodiment 7 illustrates an example of a step diagram of a target first-type signaling and a target second-type signaling, as shown in FIG. 7. In FIG. 7, the base station N5 is a maintenance base station for a serving cell of the UE U6. The present embodiment is the details of S11 to S14 for the base station N1 and the details of S21 to S24 for the UE U2 in Embodiment 5.

At the UE U6 side:

The UE U6 monitors a target first-type signaling in a target first-type time unit in S60; the target first-type signaling indicates whether a target first time-frequency resource subpool is occupied; if the UE U6 detects the target first-type signaling, the UE U6 executes S601; if the UE U6 does not detect the target first-type signaling, the UE U6 executes S602. At the base station N5 side: corresponding to S601, the base station N5 transmits the target first-type signaling in the target first-type time unit; corresponding to S602, the base station does not transmit the target first-type signaling in the target first-type time unit.

In S601, the UE U6 monitors a first-type radio signal in the target first time-frequency resource subpool.

In S602, the UE U6 monitors a target second-type signaling in a target second-type time unit, wherein the target second-type signaling indicates whether a target second time-frequency resource subpool is occupied, and the target second time-frequency resource subpool corresponds to the target first time-frequency resource subpool; if the UE U6 detects the target second-type signaling, the UE U6 executes S6021; if the UE U6 does not detect the target second-type signaling, the UE U6 executes S6022. At the base station N5 side: corresponding to S6021, the base station transmits the target second-type signaling in the target second-type time unit; corresponding to S6022, the base station N5 does not transmit the target second-type signaling in the target second-type time unit.

In S6021, the UE U6 monitors a first-type radio signal in the target second time-frequency resource subpool.

In S6022, the UE U6 monitors a first-type radio signal in a target third time-frequency resource subpool, wherein the target third time-frequency resource subpool corresponds to the target second time-frequency resource subpool.

In one subembodiment, before the UE U6 executes S6022, the UE U6 further needs to detect a target third-type signaling in a target third time unit, wherein the third-type signaling is used for determining whether the target third time-frequency resource subpool is occupied by the base station N5.

In one subembodiment, the case that the target first time-frequency resource subpool is not occupied is used for determining that the target second time-frequency resource subpool belongs to the second time-frequency resource pool in the present disclosure.

In one subembodiment, the case that the target second time-frequency resource subpool is not occupied is used for determining that the target third time-frequency resource subpool belongs to the third time-frequency resource pool in the present disclosure.

In one subembodiment, the target first time-frequency resource subpool is any one of the Q1 first time-frequency resource subpools in the present disclosure.

In one subembodiment, the target second-type time unit is a second-type time unit of the Q1 second-type time units in the present disclosure which is occupied by the target second-type signaling.

In one subembodiment, the S6022 occurs only when the third frequency subband in the present disclosure exists.

In one subembodiment, the steps in Embodiment 6 are repeated Q1 times in Embodiment 5.

Embodiment 8

Figure 8:
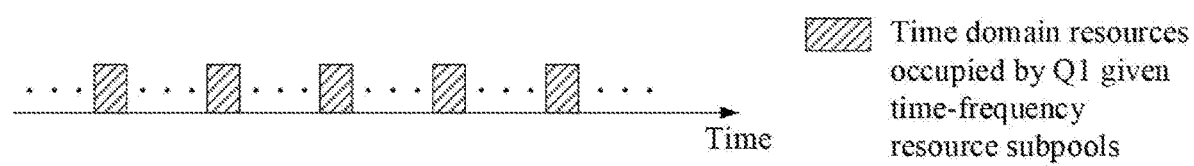
FIG. 8 is a diagram of Q1 given time-frequency resource subpools according to the present disclosure.

Embodiment 8 illustrates an example of a diagram of Q1 given time-frequency resource subpools, as shown in FIG. 8. The Q1 given time-frequency resource subpools correspond to the Q1 first time-frequency resource subpools in the present disclosure, or the Q1 given time-frequency resource subpools correspond to the Q1 second time-frequency resource subpools in the present disclosure, or the Q1 given time-frequency resource subpools correspond to the Q1 third time-frequency resource subpools in the present disclosure.

In one subembodiment, the Q1 given time-frequency resource subpools are distributed periodically in time domain.

In one subembodiment, a given second time-frequency resource subpool is located between two adjacent first time-frequency resource subpools in time domain, and the given second time-frequency resource subpool is any one of the Q1 second time-frequency resource subpools.

In one affiliated embodiment of the above subembodiment, the given second time-frequency resource subpool belongs to the second time-frequency resource pool in the present disclosure, and one first time-frequency resource subpool of the two adjacent first time-frequency resource subpools which is located before the given second time-frequency resource subpool in time domain is not occupied.

In one subembodiment, a given third time-frequency resource subpool is located between two adjacent second time-frequency resource subpools in time domain, and the given third time-frequency resource subpool is any one of the Q1 third time-frequency resource subpools.

In one affiliated embodiment of the above subembodiment, the given third time-frequency resource subpool belongs to the third time-frequency resource pool in the present disclosure, and one second time-frequency resource subpool of the two adjacent second time-frequency resource subpools which is located before the given third time-frequency resource subpool in time domain is not occupied.

In one subembodiment, the Q1 first time-frequency resource subpools, the Q1 second time-frequency resource subpools and the Q1 third time-frequency resource subpools are distributed in turn in time domain.

In one affiliated embodiment of the above subembodiment, the second time time-frequency resource subpool is included in time domain resources between any two first time-frequency resource subpools adjacent in time domain of the Q1 first time-frequency resource subpools.

In one affiliated embodiment of the above subembodiment, the third time time-frequency resource subpool is included in time domain resources between any two second time-frequency resource subpools adjacent in time domain of the Q1 second time-frequency resource subpools.

Embodiment 9

Figure 9:
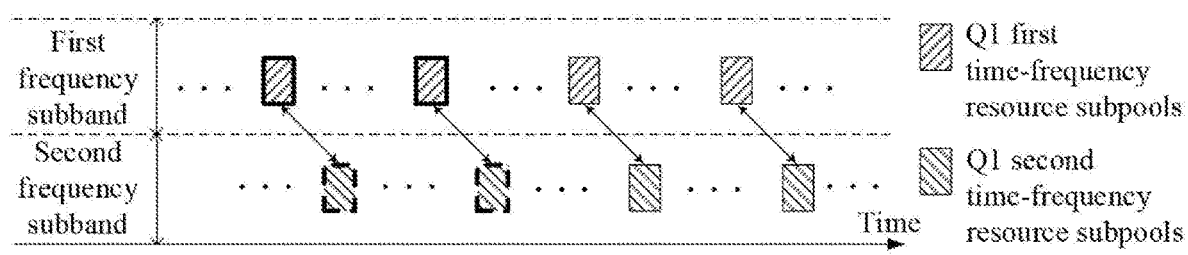
FIG. 9 is a diagram of a first time-frequency resource pool and a second time-frequency resource pool according to the present disclosure.

Embodiment 9 illustrates an example of a diagram of a first time-frequency resource pool and a second time-frequency resource pool, as shown in FIG. 9. In FIG. 9, the first time-frequency resource pool includes Q1 first time-frequency resource subpools, and the Q1 first time-frequency resource subpools are one-to-one corresponding to Q1 second time-frequency resource subpools; whether any one first time-frequency resource subpool of the Q1 first time-frequency resource subpools is occupied is used for determining whether the second time-frequency resource pool includes a corresponding second time-frequency resource subpool. In FIG. 9, the first time-frequency resource subpools corresponding to bold-line boxes are not occupied, the second time-frequency resource subpools corresponding to bold-dash-line boxes belong to the second time-frequency resource pool, and a double sided arrow indicates a one-to-one correspondence.

In one subembodiment, a time interval between two first time-frequency resource subpools adjacent in time domain is a Discontinuous Reception (DRX) periodicity of the UE in the present disclosure.

In one subembodiment, two first time-frequency resource subpools adjacent in time domain correspond to two adjacent Paging Occasions (POs) of the UE respectively.

In one subembodiment, a time interval between two first time-frequency resource subpools adjacent in time domain is equal to a time interval between two second time-frequency resource subpools adjacent in time domain.

Embodiment 10

Figure 10:
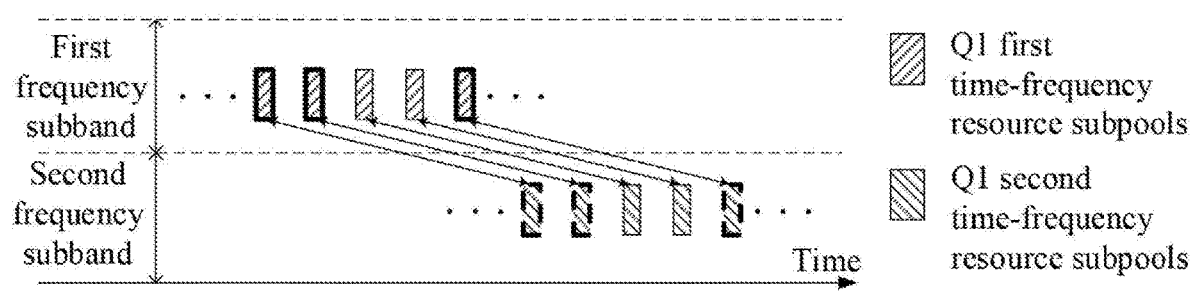
FIG. 10 is another diagram of a first time-frequency resource pool and a second time-frequency resource pool according to the present disclosure.

Embodiment 10 illustrates an example of another diagram of a first time-frequency resource pool and a second time-frequency resource pool, as shown in FIG. 10. In FIG. 10, the first time-frequency resource pool includes Q1 first time-frequency resource subpools, and the Q1 first time-frequency resource subpools are one-to-one corresponding to Q1 second time-frequency resource subpools; whether any one first time-frequency resource subpool of the Q1 first time-frequency resource subpools is occupied is used for determining whether the second time-frequency resource pool includes a corresponding second time-frequency resource subpool. In FIG. 10, the first time-frequency resource subpools corresponding to bold-line boxes are not occupied, the second time-frequency resource subpools corresponding to bold-dash-line boxes belong to the second time-frequency resource pool, and a double sided arrow indicates a one-to-one correspondence.

In one subembodiment, a time interval between two first time-frequency resource subpools adjacent in time domain is a DRX periodicity of the UE in the present disclosure.

In one subembodiment, two first time-frequency resource subpools adjacent in time domain correspond to two adjacent POs of the UE respectively.

In one affiliated embodiment of the above subembodiment, the two adjacent POs may refer to a timing synchronization and a System Frame Number (SFN) on the first frequency subband.

In one subembodiment, a time interval between two first time-frequency resource subpools adjacent in time domain is equal to a time interval between two second time-frequency resource subpools adjacent in time domain.

In one subembodiment, none of the second time-frequency resource subpools is included in time domain resources between two first time-frequency resource subpools adjacent in time domain.

Embodiment 11

Figure 11:
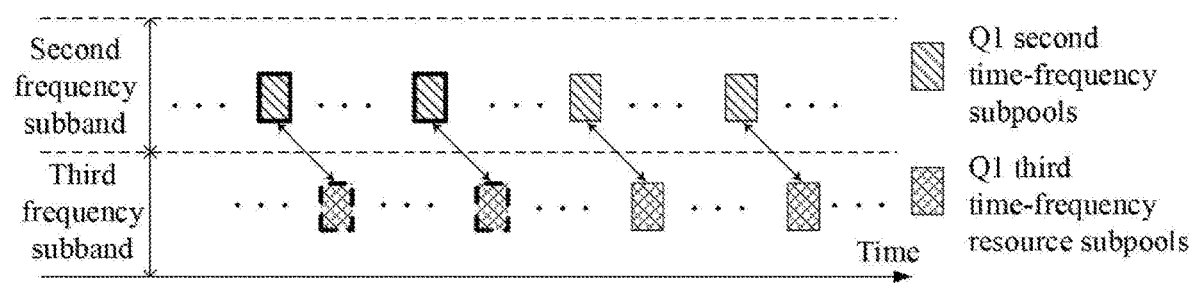
FIG. 11 is a diagram of a second time-frequency resource pool and a third time-frequency resource pool according to the present disclosure.

Embodiment 11 illustrates an example of a diagram of a second time-frequency resource pool and a third time-frequency resource pool, as shown in FIG. 11. In FIG. 11, the Q1 second time-frequency resource subpools are one-to-one corresponding to Q1 third time-frequency resource subpools; whether any one second time-frequency resource subpool of the Q1 second time-frequency resource subpools is occupied is used for determining whether the third time-frequency resource pool includes a corresponding third time-frequency resource subpool. In FIG. 11, the second time-frequency resource subpools corresponding to bold-line boxes are not occupied, the third time-frequency resource subpools corresponding to bold-dash-line boxes belong to the third time-frequency resource pool, and a double sided arrow indicates a one-to-one correspondence.

In one subembodiment, a time interval between two second time-frequency resource subpools adjacent in time domain is a DRX periodicity of the UE in the present disclosure.

In one subembodiment, two second time-frequency resource subpools adjacent in time domain correspond to two adjacent POs of the UE which are translated by Y slots in time domain, respectively.

In one affiliated embodiment of the above subembodiment, the two adjacent POs may refer to a timing synchronization and an SFN on the first frequency subband.

In one subembodiment, a time interval between two second time-frequency resource subpools adjacent in time domain is equal to a time interval between two third time-frequency resource subpools adjacent in time domain.

Embodiment 12

Figure 12:
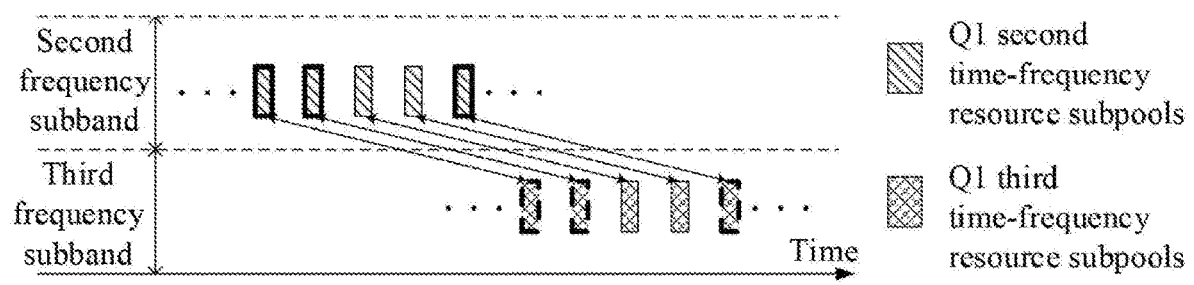
FIG. 12 is another diagram of a second time-frequency resource pool and a third time-frequency resource pool according to the present disclosure.

Embodiment 12 illustrates an example of another diagram of a second time-frequency resource pool and a third time-frequency resource pool, as shown in FIG. 12. In FIG. 12, the Q1 second time-frequency resource subpools are one-to-one corresponding to Q1 third time-frequency resource subpools; whether any one second time-frequency resource subpool of the Q1 second time-frequency resource subpools is occupied is used for determining whether the third time-frequency resource pool includes a corresponding third time-frequency resource subpool. In FIG. 12, the second time-frequency resource subpools corresponding to bold-line boxes are not occupied, the third time-frequency resource subpools corresponding to bold-dash-line boxes belong to the third time-frequency resource pool, and a double sided arrow indicates a one-to-one correspondence.

In one subembodiment, a time interval between two second time-frequency resource subpools adjacent in time domain is a DRX periodicity of the UE in the present disclosure.

In one subembodiment, two second time-frequency resource subpools adjacent in time domain correspond to two adjacent POs of the UE respectively.

In one affiliated embodiment of the above subembodiment, the two adjacent POs may refer to a timing synchronization and an SFN on the second frequency subband.

In one subembodiment, a time interval between two second time-frequency resource subpools adjacent in time domain is equal to a time interval between two third time-frequency resource subpools adjacent in time domain.

In one subembodiment, none of the third time-frequency resource subpools is included in time domain resources between two time-frequency resource subpools adjacent in time domain.

Embodiment 13

Figure 13:
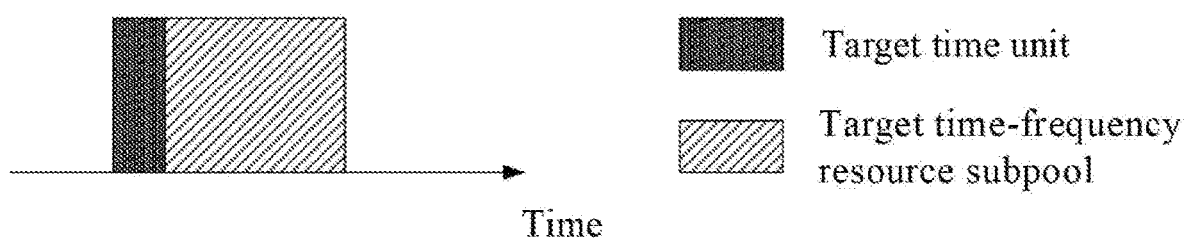
FIG. 13 is a diagram of a target time unit and a target time-frequency resource subpool according to the present disclosure.

Embodiment illustrates an example of a diagram of a target time unit and a target time-frequency resource subpool, as shown in FIG. 13. In FIG. 13, the UE in the present disclosure monitors a target signaling in the target time unit, and the monitoring for the target signaling is used for determining whether the target time-frequency resource subpool is occupied.

In one subembodiment, the target time unit is a given first-type time unit, the target signaling is a given first-type signaling monitored in the given first-type time unit by the UE, the target time-frequency resource subpool is a first time-frequency resource subpool of the Q1 first time-frequency resource subpools which is corresponding to the given first-type signaling; and the given first-type time unit is any one of the Q1 first-type time units in the present disclosure.

In one subembodiment, the target time unit is a given second-type time unit, the target signaling is a given second-type signaling monitored in the given second-type time unit by the UE, the target time-frequency resource subpool is a second time-frequency resource subpool of the Q1 second time-frequency resource subpools which is corresponding to the given second-type signaling; and the given second-type time unit is any one of the Q1 second-type time units in the present disclosure.

In one subembodiment, the target time unit is a given third-type time unit, the target signaling is a given third-type signaling monitored in the given third-type time unit by the UE, the target time-frequency resource subpool is a third time-frequency resource subpool of the Q1 third time-frequency resource subpools which is corresponding to the given third-type signaling; and the given third-type time unit is any one of the Q1 third-type time units in the present disclosure.

In one subembodiment, before transmitting the target signaling, the base station in the present disclosure performs channel monitoring for a target frequency subband.

In one affiliated embodiment of the above embodiment, the channel monitoring is an LBT.

In one affiliated embodiment of the above embodiment, the channel monitoring is a Clear Channel Assessment (CCA).

In one affiliated embodiment of the above embodiment, the target signaling belongs to the first-type signaling in the present disclosure, and the target frequency subband is the first frequency subband in the present disclosure.

In one affiliated embodiment of the above embodiment, the target signaling belongs to the second-type signaling in the present disclosure, and the target frequency subband is the second frequency subband in the present disclosure.

In one affiliated embodiment of the above embodiment, the target signaling belongs to the third-type signaling in the present disclosure, and the target frequency subband is the third frequency subband in the present disclosure.

Embodiment 14

Figure 14:
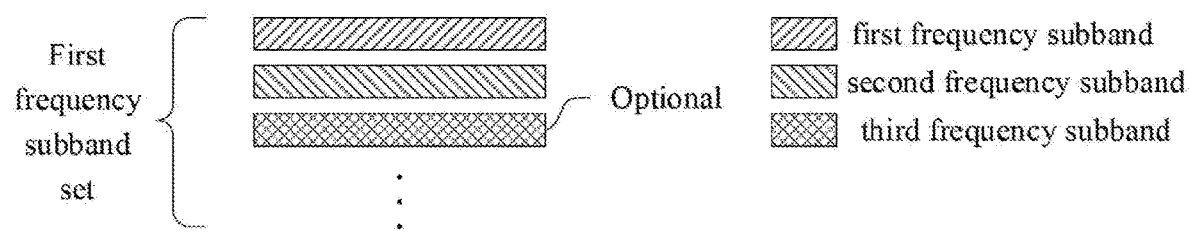
FIG. 14 is a diagram of a first frequency subband set according to the present disclosure.

Embodiment 14 illustrates an example of a diagram of a first frequency subband set, as shown in FIG. 14. In FIG. 14, the first frequency subband set includes at least the former two of the first frequency subband, the second frequency subband and the third frequency subband in the present disclosure.

In one subembodiment, the first frequency subband corresponds to a Component Carrier (CC).

In one subembodiment, the first frequency subband corresponds to a BWP.

In one subembodiment, the second frequency subband corresponds to a CC.

In one subembodiment, the second frequency subband corresponds to a BWP.

In one subembodiment, the third frequency subband corresponds to a CC.

In one subembodiment, the third frequency subband corresponds to a BWP.

In one subembodiment, the first frequency subband and the second frequency subband are consecutive in frequency domain.

In one subembodiment, the second frequency subband and the third frequency subband are consecutive in frequency domain.

In one subembodiment, the first frequency subband and the second frequency subband are discrete in frequency domain.

In one subembodiment, the second frequency subband and the third frequency subband are discrete in frequency domain.

In one subembodiment, a center frequency corresponding to the first frequency subband, a center frequency corresponding to the second frequency subband and a center frequency corresponding to the third frequency subband increase in turn in frequency domain.

In one subembodiment, a center frequency corresponding to the first frequency subband, a center frequency corresponding to the second frequency subband and a center frequency corresponding to the third frequency subband decrease in turn in frequency domain.

In one subembodiment, the first frequency subband set further includes other frequency subbands, besides the first frequency subband, the second frequency subband and the third frequency subband.

Embodiment 15

Figure 15:
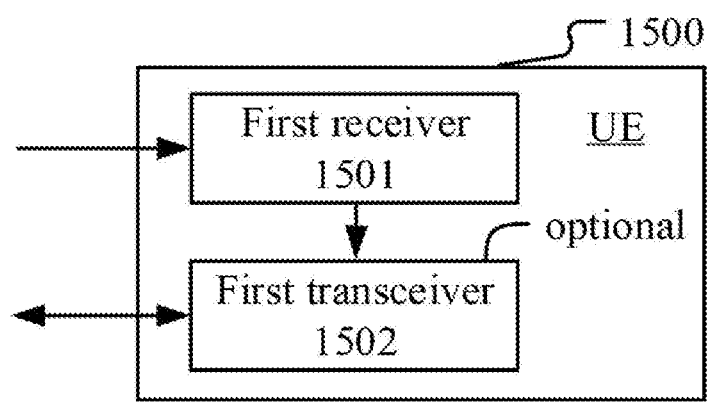
FIG. 15 is a structure block diagram illustrating a processing device in a UE according to one embodiment of the present disclosure.

Embodiment 15 illustrates an example of a structure block diagram of a processing device in a UE, as shown in FIG. 15. In FIG. 15, the processing device 1500 in the UE includes a first receiver 1501 and a first transceiver 1502, wherein the first transceiver 1502 is optional.

The first receiver 1501 monitors a first-type radio signal in each of a first time-frequency resource pool and a second time-frequency resource pool respectively.

The first transceiver 1502 receives a second radio signal.

In Embodiment 15, the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; the Q1 is a positive integer; the first-type radio signal includes first configuration information, the first configuration information is applicable to the second radio signal, and the first configuration information includes at least one among occupied frequency domain resources, an MCS, and a HARQ process number; and the first-type radio signal is a physical layer signaling.

In one subembodiment, the first receiver 1501 further monitors a first-type signaling in each of Q1 first-type time units respectively; the monitoring for the first-type signaling is used for determining whether a given first time-frequency resource subpool is occupied, and the given first time-frequency resource subpool is a first time-frequency resource subpool of the Q1 first time-frequency resource subpools which is corresponding to the first-type signaling.

In one subembodiment, the first receiver 1501 further monitors the first-type radio signal in a third time-frequency resource pool; the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool includes a corresponding third time-frequency resource subpool.

In one subembodiment, the first receiver 1501 further monitors a second-type signaling in each of Q1 second-type time units respectively; the monitoring for the second-type signaling is used for determining whether a given second time-frequency resource subpool is occupied, and the given second time-frequency resource subpool is a second time-frequency resource subpool of the Q1 second time-frequency resource subpools which is corresponding to the second-type signaling.

In one subembodiment, the first transceiver 1502 transmits a third radio signal; the first-type radio signal includes second configuration information, the second configuration information is applicable to the third radio signal, and the second configuration information includes at least one among occupied frequency domain resources, an MCS, and a HARQ process number; and the second-type radio signal is a physical layer signaling.

In one subembodiment, the first-type radio signal includes paging relevant information.

In one subembodiment, the first receiver 1501 further receives first information; the first information is used for determining a first frequency subband set, and the first frequency subband set includes the first frequency subband and the second frequency subband; and the first information is transmitted via an air interface.

In one subembodiment, the first receiver 1501 includes at least the former two of the receiver 456, the receiving processor 452, and the controller/processor 490 mentioned in Embodiment 4.

In one subembodiment, the first transceiver 1502 includes at least the former three of the receiver/transmitter 456, the receiving processor 452, the transmitting processor 455, and the controller/processor 490 mentioned in Embodiment 4.

Embodiment 16

Figure 16:
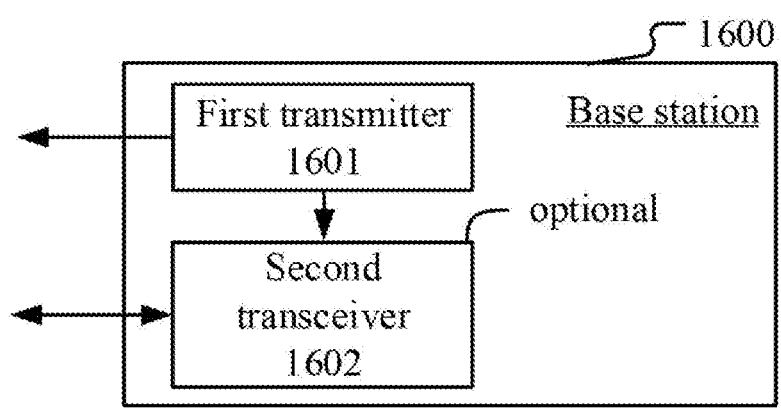
FIG. 16 is a structure block diagram illustrating a processing device in a base station according to one embodiment of the present disclosure.

Embodiment 16 illustrates an example of a structure block diagram of a processing device in a base station device, as shown in FIG. 16. In FIG. 16, the processing device 1600 in the base station includes a first transmitter 1601 and a second transceiver 1602, wherein the second transceiver 1602 is optional.

The first transmitter 1601 transmits a first-type radio signal in one of a first time-frequency resource pool and a second time-frequency resource pool.

The second transceiver 1602 transmits a second radio signal.

In Embodiment 16, the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool includes Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool includes a corresponding second time-frequency resource subpool; a receiver of the first-type radio signal includes a first terminal; the Q1 is a positive integer; the first-type radio signal includes first configuration information, the first configuration information is applicable to the second radio signal, and the first configuration information includes at least one among occupied frequency domain resources, an MCS, and a HARQ process number; and the first-type radio signal is a physical layer signaling.

In one subembodiment, the first transmitter 1601 further transmits R1 first-type signalings in R1 first-type time units of Q1 first-type time units respectively; the R1 first-type time units correspond to R1 first time-frequency resource subpools of the Q1 first time-frequency resource subpools respectively; monitorings for the R1 first-type signalings in the Q1 first-type time units by the first terminal is used by the first terminal to determine whether the Q1 first time-frequency resource subpools are occupied; and the R1 is a positive integer not greater than the Q1.

In one subembodiment, the first transmitter 1601 further transmits the first-type radio signal in a third time-frequency resource pool; the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool includes a corresponding third time-frequency resource subpool.

In one subembodiment, the first transmitter 1601 further transmits P1 second-type signalings in P1 second-type time units of Q1 second-type time units respectively; the P1 second-type time units correspond to P1 second time-frequency resource subpools of the Q1 second time-frequency resource subpools respectively; monitorings for the P1 second-type signalings in the Q1 second-type time units by the first terminal is used by the first terminal to determine whether the Q1 second time-frequency resource subpools are occupied; and the P1 is a positive integer not greater than the Q1.

In one subembodiment, the second transceiver 1602 receives a third radio signal; the first-type radio signal includes second configuration information, the second configuration information is applicable to the third radio signal, and the second configuration information includes at least one among occupied frequency domain resources, an MCS, and a HARQ process number; and the second-type radio signal is a physical layer signaling.

In one subembodiment, the first-type radio signal includes paging relevant information.

In one subembodiment, the first transmitter 1601 further transmits first information; the first information is used for determining a first frequency subband set, and the first frequency subband set includes the first frequency subband and the second frequency subband; and the first information is transmitted via an air interface.

In one subembodiment, the first transmitter 1601 includes at least the former two of the transmitter 416, the transmitting processor 415, and the controller/processor 440 mentioned in Embodiment 4.

In one subembodiment, the second transceiver 1602 includes at least the former three of the transmitter/receiver 416, the transmitting processor 415, the receiving processor 412, and the controller/processor 440 mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base stations, gNBs (NR nodes B), TRPs, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
    monitoring a first-type radio signal in each of a first time-frequency resource pool and a second time-frequency resource pool respectively;
    wherein the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool comprises Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool comprises a corresponding second time-frequency resource subpool; and the Q1 is a positive integer greater than 1.

2. The method according to claim 1, comprising:
monitoring a first-type signaling in each of Q1 first-type time units respectively;
wherein the monitoring for the first-type signaling is used for determining whether a given first time-frequency resource subpool is occupied, and the given first time-frequency resource subpool is a first time-frequency resource subpool of the Q1 first time-frequency resource subpools which is corresponding to the first-type signaling;
or, monitoring a second-type signaling in each of Q1 second-type time units respectively;
wherein the monitoring for the second-type signaling is used for determining whether a given second time-frequency resource subpool is occupied, and the given second time-frequency resource subpool is a second time-frequency resource subpool of the Q1 second time-frequency resource subpools which is corresponding to the second-type signaling;
or receiving first information;
wherein the first information is used for determining a first frequency subband set, and the first frequency subband set comprises the first frequency subband and the second frequency subband; and the first information is transmitted via an air interface.

3. The method according to claim 1, comprising:
monitoring the first-type radio signal in a third time-frequency resource pool;
wherein the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool comprises a corresponding third time-frequency resource subpool.

4. The method according to claim 1, comprising:
receiving a second radio signal;
wherein the first-type radio signal comprises first configuration information, the first configuration information is applicable to the second radio signal, and the first configuration information comprises at least one among occupied frequency domain resources, a Modulation and Coding Scheme, and a HARQ process number; the first-type radio signal is a physical layer signaling;
or transmitting a third radio signal;
wherein the first-type radio signal comprises second configuration information, the second configuration information is applicable to the third radio signal, and the second configuration information comprises at least one among occupied frequency domain resources, an Modulation and Coding Scheme (MC S), and a Hybrid Automatic Repeat request (HARQ) process number; and the first-type radio signal is a physical layer signaling.

5. The method according to claim 1, wherein the first-type radio signal comprises paging relevant information.

6. A method in a base station for wireless communication, comprising:
transmitting a first-type radio signal in one of a first time-frequency resource pool and a second time-frequency resource pool;
wherein the first time-frequency resource pool and the second time-frequency resource pool are located on a first frequency subband and a second frequency subband respectively, the first time-frequency resource pool and the second time-frequency resource pool are orthogonal in time domain; the first time-frequency resource pool comprises Q1 first time-frequency resource subpools, the Q1 first time-frequency resource subpools are one-to-one corresponding to Q1 second time-frequency resource subpools, and whether any one first time-frequency resource subpool of the Q1 first time-frequency resource subpools is occupied is used for determining whether the second time-frequency resource pool comprises a corresponding second time-frequency resource subpool; a receiver of the first-type radio signal comprises a first terminal;
and the Q1 is a positive integer greater than 1.

7. The method according to claim 6, comprising:
transmitting R1 first-type signalings in R1 first-type time units of Q1 first-type time units respectively;
wherein the R1 first-type time units correspond to R1 first time-frequency resource subpools of the Q1 first time-frequency resource subpools respectively; monitorings for the R1 first-type signalings in the Q1 first-type time units by the first terminal is used by the first terminal to determine whether the Q1 first time-frequency resource subpools are occupied; the R1 is a positive integer not greater than the Q1;
or transmitting P1 second-type signalings in P1 second-type time units of Q1 second-type time units respectively;
wherein the P1 second-type time units correspond to P1 second time-frequency resource subpools of the Q1 second time-frequency resource subpools respectively; monitorings for the P1 second-type signalings in the Q1 second-type time units by the first terminal is used by the first terminal to determine whether the Q1 second time-frequency resource subpools are occupied; the P1 is a positive integer not greater than the Q1;
or transmitting first information;
wherein the first information is used for determining a first frequency subband set, and the first frequency subband set comprises the first frequency subband and the second frequency subband; and the first information is transmitted via an air interface.

8. The method according to claim 6, comprising:
transmitting the first-type radio signal in a third time-frequency resource pool;
wherein the third time-frequency resource pool is located on a third frequency subband; and the Q1 second time-frequency resource subpools are one-to-one corresponding to Q1 third time-frequency resource subpools, and whether any one second time-frequency resource subpool of the Q1 second time-frequency resource subpools is occupied is used for determining whether the third time-frequency resource pool comprises a corresponding third time-frequency resource subpool.

9. The method according to claim 6, comprising:
transmitting a second radio signal;
wherein the first-type radio signal comprises first configuration information, the first configuration information is applicable to the second radio signal, and the first configuration information comprises at least one among occupied frequency domain resources, an Modulation and Coding Scheme, and a HARQ process number; the first-type radio signal is a physical layer signaling;
or receiving a third radio signal;

wherein the first-type radio signal comprises second configuration information, the second configuration information is applicable to the third radio signal, and the second configuration information comprises at least one among occupied frequency domain resources, an Modulation and Coding Scheme (MCS), and a Hybrid Automatic Repeat request (HARQ) process number; and the first-type radio signal is a physical layer signaling.

10. The method according to claim 6, wherein the first-type radio signal comprises paging relevant information.

11. A User Equipment (UE) for wireless communication, comprising:
a first receiver, to monitor a first-type radio signal in each of a first time-frequency resource pool and a second time-frequency resource pool respectively;
wherein the first time-frequency resource pool and the second time-frequency resource pool are located on a first frequency subband and a second frequency subband respectively, the first time-frequency resource pool and the second time-frequency resource pool are orthogonal in time domain;
wherein the first time-frequency resource pool comprises Q1 first time-frequency resource subpools, the Q1 first time-frequency resource subpools are one-to-one corresponding to Q1 second time-frequency resource subpools; and
wherein based on whether any one first time-frequency resource subpool of the Q1 first time-frequency resource subpools is occupied, the UE determines whether a second time-frequency resource subpool corresponding to the occupied first time-frequency resource subpool is in the second time-frequency resource pool; and the Q1 is a positive integer greater than 1.

12. The UE according to claim 11, wherein:
the first receiver monitors a first-type signaling in each of Q1 first-type time units respectively, the UE uses the monitored first-type signaling to determine whether a given first time-frequency resource subpool is occupied, and the given first time-frequency resource subpool is a first time-frequency resource subpool of the Q1 first time-frequency resource subpools corresponding to the first-type signaling; or
wherein the first receiver monitors a second-type signaling in each of Q1 second-type time units respectively, the UE uses the monitored second-type signaling to determine whether a given second time-frequency resource subpool is occupied, and the given second time-frequency resource subpool is a second time-frequency resource subpool of the Q1 second time-frequency resource subpools corresponding to the second-type signaling; or
wherein the first receiver receives first information transmitted via an air interface, the UE uses the received first information to determine a first frequency subband set, and the first frequency subband set comprises the first frequency subband and the second frequency subband.

13. The UE according to claim 11, wherein:
the first receiver monitors the first-type radio signal in a third time-frequency resource pool; the third time-frequency resource pool is located on a third frequency subband;
the Q1 second time-frequency resource subpools are one-to-one corresponding to Q1 third time-frequency resource subpools; and based on whether any one second time-frequency resource subpool of the Q1 second time-frequency resource subpools is occupied, the UE determines whether a third time-frequency resource subpool corresponding to the occupied second time-frequency resource subpool is in the third time-frequency resource pool.

14. The UE according to claim 11, comprising:
a first transceiver, to receive a second radio signal;
wherein the first-type radio signal comprises first configuration information, the first configuration information is applicable to the second radio signal, and the first configuration information comprises at least one among occupied frequency domain resources, a Modulation and Coding Scheme, and a HARQ process number; the first-type radio signal is a physical layer signaling;
or a first transceiver, to transmit a third radio signal;
wherein the first-type radio signal comprises second configuration information, the second configuration information is applicable to the third radio signal, and the second configuration information comprises at least one among occupied frequency domain resources, a Modulation and Coding Scheme (MC S), and a Hybrid Automatic Repeat request (HARQ) process number; and the first-type radio signal is a physical layer signaling.

15. The UE according to claim 11, wherein the first-type radio signal comprises paging relevant information.

16. A base station for wireless communication, comprising:
a first transmitter, arranged to transmit a first-type radio signal in one of a first time-frequency resource pool and a second time-frequency resource pool, the first-type radio signal to be received by a first terminal comprising a receiver; wherein the first time-frequency resource pool and the second time-frequency resource pool are located on a first frequency subband and a second frequency subband respectively, the first time-frequency resource pool and the second time-frequency resource pool are orthogonal in time domain, the first time-frequency resource pool comprises Q1 first time-frequency resource subpools, Q1 is a positive integer greater than 1, and the Q1 first time-frequency resource subpools are one-to-one corresponding to each of Q1 second time-frequency resource subpools; and
wherein based on whether any one first time-frequency resource subpool of the Q1 first time-frequency resource subpools is occupied, the base station determines whether a second time-frequency resource subpool corresponding to the occupied first time-frequency resource subpool is in the second time-frequency resource pool.

17. The base station according to claim 16, wherein the first transmitter transmits R1 first-type signalings in R1 first-type time units of Q1 first-type time units respectively, wherein the R1 first-type time units correspond to R1 first time-frequency resource subpools of the Q1 first time-frequency resource subpools respectively; monitorings for the R1 first-type signalings in the Q1 first-type time units by the first terminal is used by the first terminal to determine whether the Q1 first time-frequency resource subpools are occupied; the R1 is a positive integer not greater than the Q1; or
the first transmitter transmits P1 second-type signalings in P1 second-type time units of Q1 second-type time units respectively, wherein the P1 second-type time units correspond to P1 second time-frequency resource subpools of the Q1 second time-frequency resource subpools respectively; monitorings for the P1 second-type signalings in the Q1 second-type time units by the first terminal is used by the first terminal to determine whether the Q1 second time-frequency resource subpools are occupied; the P1 is a positive integer not greater than the Q1, or the first transmitter transmits first information via an air interface, and the base station determines a first frequency subband set based on the first information, wherein the first frequency subband set comprises the first frequency subband and the second frequency subband.

18. The base station according to claim 16, wherein the first transmitter transmits the first-type radio signal in a third time-frequency resource pool; the third time-frequency resource pool is located on a third frequency subband; and the Q1 second time-frequency resource subpools are one-to-one corresponding to Q1 third time-frequency resource subpools, and
wherein based on whether any one second time-frequency resource subpool of the Q1 second time-frequency resource subpools is occupied, the base station determines whether a third time-frequency resource subpool corresponding to the occupied second time-frequency resource subpool is in the third time-frequency resource pool.

19. The base station according to claim 16, comprising:
a second transceiver, to transmit a second radio signal;
wherein the first-type radio signal comprises first configuration information, the first configuration information is applicable to the second radio signal, and the first configuration information comprises at least one among occupied frequency domain resources, an Modulation and Coding Scheme (MCS), and a Hybrid Automatic Repeat request (HARQ) process number; the first-type radio signal is a physical layer signaling;
or a second transceiver, to receive a third radio signal;
wherein the first-type radio signal comprises second configuration information, the second configuration information is applicable to the third radio signal, and the second configuration information comprises at least one among occupied frequency domain resources, an Modulation and Coding Scheme, and a HARQ process number; and the first-type radio signal is a physical layer signaling.

20. The base station according to claim 16, wherein the first-type radio signal comprises paging relevant information.

* * * * *